United States Patent
Kawabata

(10) Patent No.: US 6,330,359 B1
(45) Date of Patent: *Dec. 11, 2001

(54) PEN-GRIP TYPE OF INPUT APPARATUS USING FINGER PRESSURE AND GRAVITY SWITCHES FOR CHARACTER RECOGNITION

(75) Inventor: Kazuki Kawabata, Osaka (JP)

(73) Assignee: Japan Nesamac Corporation, Osaka (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/722,269

(22) PCT Filed: Apr. 7, 1994

(86) PCT No.: PCT/JP94/00584

§ 371 Date: Oct. 7, 1996

§ 102(e) Date: Oct. 7, 1996

(87) PCT Pub. No.: WO95/27935

PCT Pub. Date: Oct. 19, 1995

(51) Int. Cl.[7] .............................. G06K 9/00; G06K 9/22; G06K 9/46
(52) U.S. Cl. ........................ 382/188; 382/314; 382/207
(58) Field of Search .................................. 382/187, 188, 382/201, 203, 207, 314; 345/158; 341/34; 178/18.01

(56) References Cited

U.S. PATENT DOCUMENTS

| | | | |
|---|---|---|---|
| 3,579,186 | * 5/1971 | Johnson et al. | 382/121 |
| 3,621,720 | * 11/1971 | Clark | 73/432 |
| 4,040,010 | 8/1977 | Crane et al. | 340/146.3 |
| 4,131,880 | 12/1978 | Siy et al. | 340/146.3 |
| 4,142,175 | * 2/1979 | Herbst et al. | 340/146 |
| 4,445,011 | * 4/1984 | Hansen | 200/52 R |
| 4,526,547 | * 7/1985 | Rusk | 434/166 |
| 4,553,258 | * 11/1985 | Chainer et al. | 382/3 |

(List continued on next page.)

FOREIGN PATENT DOCUMENTS

| | | |
|---|---|---|
| 51-44829 | 4/1976 | (JP) . |
| 57-045681 | 3/1982 | (JP) . |
| 57-45681 | 3/1982 | (JP) . |
| 60-17528 | 1/1985 | (JP) . |
| 61-51227 | 3/1986 | (JP) . |
| 61-135240 | 8/1986 | (JP) . |
| 61-192340 | 11/1986 | (JP) . |
| 61-192341 | 11/1986 | (JP) . |

(List continued on next page.)

Primary Examiner—Amelia M. Au
Assistant Examiner—Martin E Miller
(74) Attorney, Agent, or Firm—Merchant & Gould P.C.

(57) ABSTRACT

This invention provides an input apparatus which can correctly recognize and accept hand-written characters as soon as they are input without using such an input device as an optical character reader or a keyboard. when characters, etc., are written using a writing instrument having a pen grip (22) fitted thereto, the pressure of fingers applied to the writing instrument is measured by strain gauges (28a, ..., 28c). The strain gauges (28a, ..., 28c) output the pressure change of the fingers as waveforms representing electrical changes to a CPU. The CPU (40) separates the waveform into unit waveforms each corresponding to one character, and analyzes wave characteristics for each unit waveform. The waveform characteristics of the written character are then compared and collated with the waveform characteristics of each character of a writer which are in advance learned and stored. Accordingly, the hand-written characters can be correctly recognized immediately after written. Since mercury switches (29a, ... 29C) monitor the correspondence relationship between the fingers and the strain gauges (28a, ..., 28C), recognition can be normally made even when a mode of gripping of the writing instrument is changed.

43 Claims, 25 Drawing Sheets

U.S. PATENT DOCUMENTS

| | | | |
|---|---|---|---|
| 4,751,741 | * 6/1988 | Mochinaga et al. | 382/13 |
| 4,789,934 | * 12/1988 | Gundersen et al. | 364/419 |
| 4,797,938 | 1/1989 | Will . | |
| 4,896,543 | 1/1990 | Gullman | 73/862.04 |
| 4,975,546 | * 12/1990 | Craig | 178/19.06 |
| 5,018,208 | * 5/1991 | Gladstone | 382/3 |
| 5,059,958 | * 10/1991 | Jacobs et al. | 340/706 |
| 5,095,510 | 3/1992 | Webster | 382/3 |
| 5,248,855 | * 9/1993 | Cambridge | 178/18 |
| 5,548,092 | * 8/1996 | Shriver | 178/18 |
| 5,730,602 | * 3/1998 | Gierhart et al. | 434/155 |

FOREIGN PATENT DOCUMENTS

| | | |
|---|---|---|
| 62-83682 | 5/1987 | (JP) . |
| 1-68537 | 5/1989 | (JP) . |
| 1-248224 | 10/1989 | (JP) . |
| 2-287775 | 11/1990 | (JP) . |
| 3-010390 | 1/1991 | (JP) . |
| 3-263116 | 11/1991 | (JP) . |
| 4-238582 | 8/1992 | (JP) . |
| WO 89/12283 | 12/1989 | (WO) . |

* cited by examiner

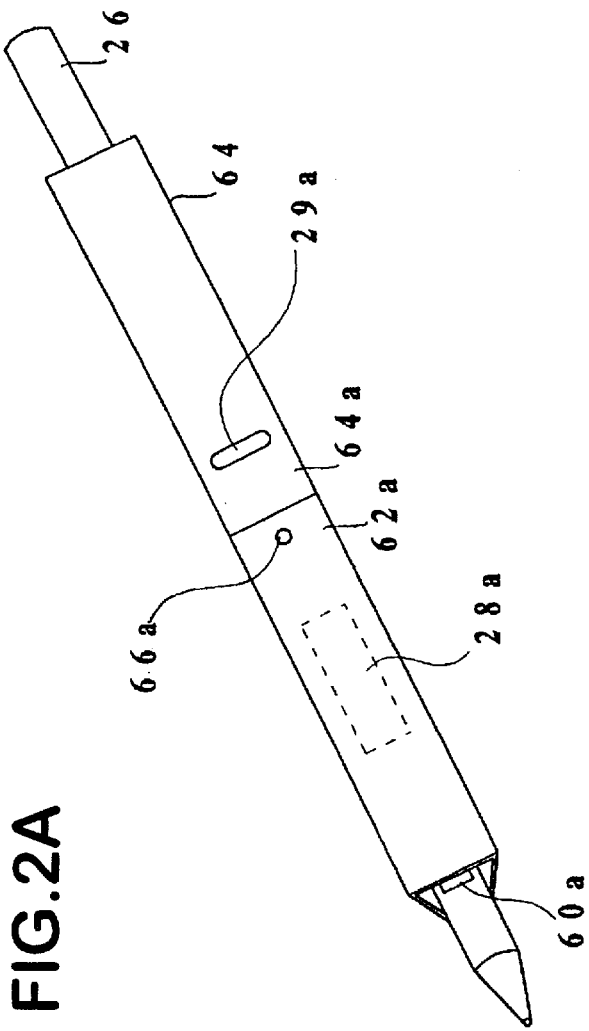
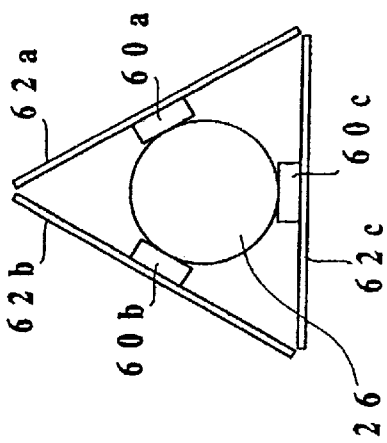
FIG.2A
FIG.2B

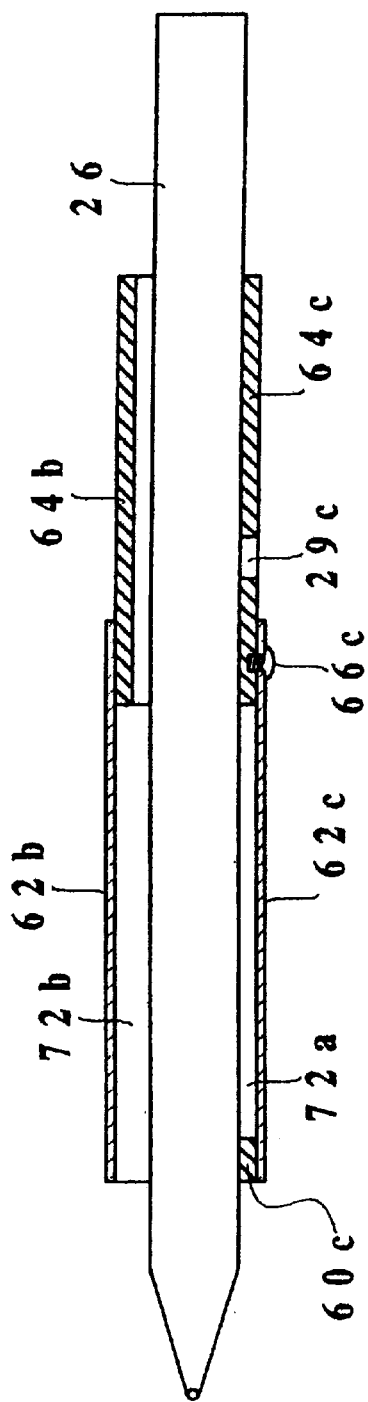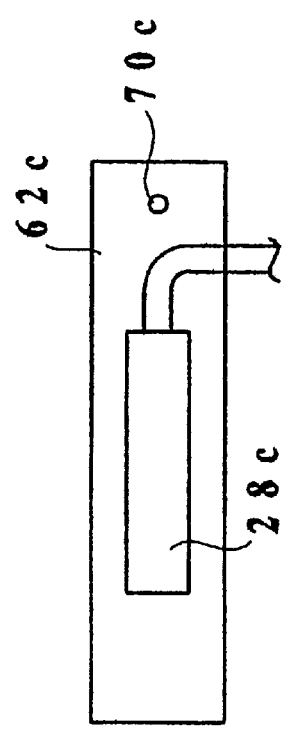
FIG.3A
FIG.3B

29a:Mercury switch

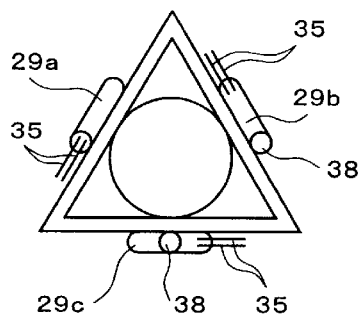 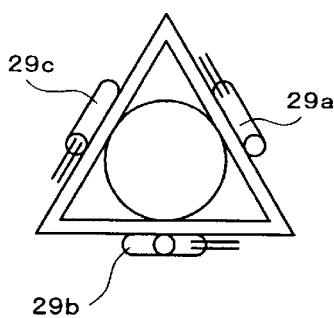 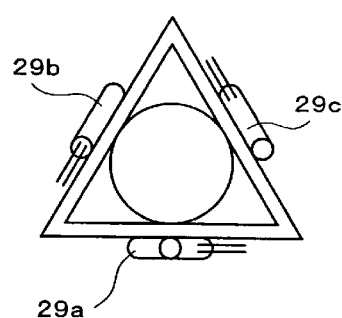
FIG.6A Held state A  FIG.6B Held state B  FIG.6C Held state C
FIG.7
|  | Held state A | Held state B | Held state C |
|---|---|---|---|
| Mercury switch 29a | ON | OFF | — |
| Mercury switch 29b | OFF | — | ON |
| Mercury switch 29c | — | ON | OFF |

FIG.8
|  | Held state A | Held state B | Held state C |
|---|---|---|---|
| Strain gauge 28a | Index finger | Thumb | Middle finger |
| Strain gauge 28b | Thumb | Middle finger | Index finger |
| Strain gauge 28c | Middle finger | Index finger | Thumb |
FIG.9A
FIG.9B
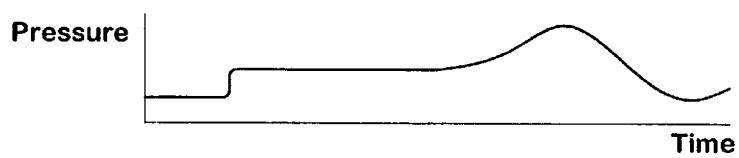
FIG.9C
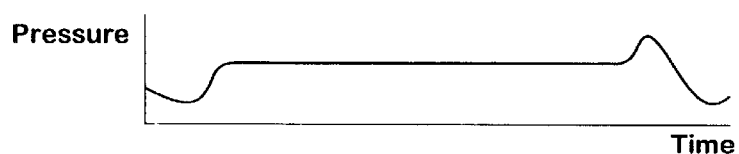

L7:Unit waveform

FIG.14

WRITING TIME

| | | MINIMUM WRITING TIME | AVERAGE WRITING TIME | MAXIMUM WRITING TIME |
|---|---|---|---|---|
| SYMBOLS | ○ | 1 7 | 1 9. 4 | 2 4 |
| | / | 1 | 2. 9 | 5 |
| NUMERALS | 1 | 4 | 7. 5 | 1 1 |
| | 2 | 1 5 | 1 7. 4 | 2 0 |
| | 3 | 2 0 | 2 4. 0 | 2 6 |
| | 4 | 2 5 | 2 7. 1 | 3 4 |
| | 5 | 3 7 | 4 0. 0 | 4 4 |
| | 6 | 1 9 | 2 3. 9 | 3 0 |
| | 7 | 2 8 | 3 0. 1 | 3 5 |
| | 8 | 2 6 | 2 9. 5 | 3 1 |
| | 9 | 2 2 | 2 5. 0 | 2 8 |
| | 0 | 1 3 | 1 5. 5 | 1 8 |

FIG.15

SYMBOL 「O」
NUMBER OF HIGHS

| NUMBER OF HIGHS | 0 | 1 | 2 | 3 | 4 | 5 | 6 | 7 | 8 | 9 | 10 |
|---|---|---|---|---|---|---|---|---|---|---|---|
| MIDDLE FINGER | 5 | 5 | 0 | 0 | 0 | 0 | 0 | 0 | 0 | 0 | 0 |
| INDEX FINGER | 0 | 2 | 8 | 0 | 0 | 0 | 0 | 0 | 0 | 0 | 0 |
| THUMB | 0 | 4 | 3 | 3 | 0 | 0 | 0 | 0 | 0 | 0 | 0 |

SYMBOL 「/」

| NUMBER OF HIGHS | 0 | 1 | 2 | 3 | 4 | 5 | 6 | 7 | 8 | 9 | 10 |
|---|---|---|---|---|---|---|---|---|---|---|---|
| MIDDLE FINGER | 7 | 3 | 0 | 0 | 0 | 0 | 0 | 0 | 0 | 0 | 0 |
| INDEX FINGER | 3 | 7 | 0 | 0 | 0 | 0 | 0 | 0 | 0 | 0 | 0 |
| THUMB | 4 | 6 | 0 | 0 | 0 | 0 | 0 | 0 | 0 | 0 | 0 |

NUMERAL 「1」

| NUMBER OF HIGHS | 0 | 1 | 2 | 3 | 4 | 5 | 6 | 7 | 8 | 9 | 10 |
|---|---|---|---|---|---|---|---|---|---|---|---|
| MIDDLE FINGER | 8 | 2 | 0 | 0 | 0 | 0 | 0 | 0 | 0 | 0 | 0 |
| INDEX FINGER | 0 | 10 | 0 | 0 | 0 | 0 | 0 | 0 | 0 | 0 | 0 |
| THUMB | 2 | 8 | 0 | 0 | 0 | 0 | 0 | 0 | 0 | 0 | 0 |

NUMERAL 「2」

| NUMBER OF HIGHS | 0 | 1 | 2 | 3 | 4 | 5 | 6 | 7 | 8 | 9 | 10 |
|---|---|---|---|---|---|---|---|---|---|---|---|
| MIDDLE FINGER | 9 | 1 | 0 | 0 | 0 | 0 | 0 | 0 | 0 | 0 | 0 |
| INDEX FINGER | 0 | 5 | 5 | 0 | 0 | 0 | 0 | 0 | 0 | 0 | 0 |
| THUMB | 0 | 4 | 6 | 0 | 0 | 0 | 0 | 0 | 0 | 0 | 0 |

FIG.16

SYMBOL 「〇」

NUMBER OF HIGHS

| NUMBER OF HIGHS | 0 | 1 | 2 | 3 | 4 | 5 | 6 | 7 | 8 | 9 | 10 |
|---|---|---|---|---|---|---|---|---|---|---|---|
| MIDDLE FINGER | 8 | 2 | 0 | 0 | 0 | 0 | 0 | 0 | 0 | 0 | 0 |
| INDEX FINGER | 0 | 10 | 0 | 0 | 0 | 0 | 0 | 0 | 0 | 0 | 0 |
| THUMB | 1 | 9 | 0 | 0 | 0 | 0 | 0 | 0 | 0 | 0 | 0 |

SYMBOL 「／」

| NUMBER OF HIGHS | 0 | 1 | 2 | 3 | 4 | 5 | 6 | 7 | 8 | 9 | 10 |
|---|---|---|---|---|---|---|---|---|---|---|---|
| MIDDLE FINGER | 3 | 6 | 1 | 0 | 0 | 0 | 0 | 0 | 0 | 0 | 0 |
| INDEX FINGER | 6 | 4 | 0 | 0 | 0 | 0 | 0 | 0 | 0 | 0 | 0 |
| THUMB | 3 | 6 | 1 | 0 | 0 | 0 | 0 | 0 | 0 | 0 | 0 |

NUMERAL 「1」

| NUMBER OF HIGHS | 0 | 1 | 2 | 3 | 4 | 5 | 6 | 7 | 8 | 9 | 10 |
|---|---|---|---|---|---|---|---|---|---|---|---|
| MIDDLE FINGER | 3 | 6 | 1 | 0 | 0 | 0 | 0 | 0 | 0 | 0 | 0 |
| INDEX FINGER | 9 | 1 | 0 | 0 | 0 | 0 | 0 | 0 | 0 | 0 | 0 |
| THUMB | 2 | 8 | 0 | 0 | 0 | 0 | 0 | 0 | 0 | 0 | 0 |

NUMERAL 「2」

| NUMBER OF HIGHS | 0 | 1 | 2 | 3 | 4 | 5 | 6 | 7 | 8 | 9 | 10 |
|---|---|---|---|---|---|---|---|---|---|---|---|
| MIDDLE FINGER | 6 | 4 | 0 | 0 | 0 | 0 | 0 | 0 | 0 | 0 | 0 |
| INDEX FINGER | 10 | 0 | 0 | 0 | 0 | 0 | 0 | 0 | 0 | 0 | 0 |
| THUMB | 6 | 2 | 2 | 0 | 0 | 0 | 0 | 0 | 0 | 0 | 0 |

FIG. 17

SYMBOL 「O」

PEAK POSITIONS

| ZONE NOS. | K1 | K2 | K3 | K4 | K5 | K6 | K7 | K8 | K9 | K10 | K11 | K12 | K13 | K14 | K15 | K16 |
|---|---|---|---|---|---|---|---|---|---|---|---|---|---|---|---|---|
| MIDDLE FINGER | 0 | 0 | 1 | 0 | 1 | 0 | 0 | 3 | 1 | 0 | 2 | 2 | 0 | 0 | 0 | 0 |
| INDEX FINGER | 0 | 0 | 0 | 1 | 0 | 0 | 0 | 0 | 0 | 1 | 4 | 4 | 0 | 0 | 0 | 0 |
| THUMB | 0 | 0 | 0 | 0 | 0 | 0 | 2 | 6 | 1 | 0 | 0 | 0 | 0 | 1 | 0 | 0 |

SYMBOL 「/」

| ZONE NOS. | K1 | K2 | K3 | K4 | K5 | K6 | K7 | K8 | K9 | K10 | K11 | K12 | K13 | K14 | K15 | K16 |
|---|---|---|---|---|---|---|---|---|---|---|---|---|---|---|---|---|
| MIDDLE FINGER | 0 | 0 | 0 | 5 | 1 | 3 | 0 | 0 | 0 | 0 | 0 | 0 | 0 | 0 | 0 | 0 |
| INDEX FINGER | 0 | 0 | 1 | 5 | 1 | 0 | 0 | 0 | 0 | 0 | 0 | 0 | 0 | 0 | 0 | 0 |
| THUMB | 0 | 2 | 2 | 3 | 0 | 0 | 0 | 0 | 0 | 0 | 0 | 0 | 0 | 0 | 0 | 0 |

SYMBOL 「1」

| ZONE NOS. | K1 | K2 | K3 | K4 | K5 | K6 | K7 | K8 | K9 | K10 | K11 | K12 | K13 | K14 | K15 | K16 |
|---|---|---|---|---|---|---|---|---|---|---|---|---|---|---|---|---|
| MIDDLE FINGER | 0 | 0 | 1 | 2 | 1 | 2 | 2 | 0 | 1 | 0 | 0 | 0 | 0 | 0 | 0 | 0 |
| INDEX FINGER | 0 | 0 | 0 | 5 | 2 | 1 | 0 | 0 | 0 | 1 | 1 | 0 | 1 | 0 | 0 | 0 |
| THUMB | 0 | 1 | 2 | 5 | 0 | 0 | 0 | 0 | 0 | 1 | 0 | 1 | 0 | 0 | 0 | 0 |

FIG.18

SYMBOL 「○」

BOTTOM POSITIONS

| ZONE NOS. | K1 | K2 | K3 | K4 | K5 | K6 | K7 | K8 | K9 | K10 | K11 | K12 | K13 | K14 | K15 | K16 |
|---|---|---|---|---|---|---|---|---|---|---|---|---|---|---|---|---|
| MIDDLE FINGER | 0 | 0 | 0 | 0 | 1 | 0 | 0 | 0 | 0 | 0 | 0 | 0 | 0 | 0 | 1 | 0 |
| INDEX FINGER | 0 | 0 | 0 | 0 | 1 | 5 | 3 | 1 | 0 | 0 | 0 | 0 | 0 | 0 | 0 | 0 |
| THUMB | 0 | 0 | 0 | 0 | 0 | 0 | 0 | 0 | 1 | 3 | 3 | 2 | 0 | 0 | 0 | 0 |

SYMBOL 「/」

| ZONE NOS. | K1 | K2 | K3 | K4 | K5 | K6 | K7 | K8 | K9 | K10 | K11 | K12 | K13 | K14 | K15 | K16 |
|---|---|---|---|---|---|---|---|---|---|---|---|---|---|---|---|---|
| MIDDLE FINGER | 0 | 1 | 3 | 2 | 0 | 1 | 0 | 0 | 0 | 0 | 0 | 0 | 0 | 0 | 0 | 0 |
| INDEX FINGER | 0 | 0 | 0 | 0 | 1 | 3 | 0 | 0 | 0 | 0 | 0 | 0 | 0 | 0 | 0 | 0 |
| THUMB | 0 | 0 | 0 | 0 | 0 | 7 | 0 | 0 | 0 | 0 | 0 | 0 | 0 | 0 | 0 | 0 |

SYMBOL 「1」

| ZONE NOS. | K1 | K2 | K3 | K4 | K5 | K6 | K7 | K8 | K9 | K10 | K11 | K12 | K13 | K14 | K15 | K16 |
|---|---|---|---|---|---|---|---|---|---|---|---|---|---|---|---|---|
| MIDDLE FINGER | 0 | 2 | 1 | 4 | 0 | 0 | 0 | 0 | 0 | 0 | 0 | 0 | 1 | 0 | 0 | 0 |
| INDEX FINGER | 0 | 0 | 0 | 0 | 0 | 0 | 0 | 0 | 0 | 1 | 0 | 0 | 0 | 0 | 0 | 0 |
| THUMB | 0 | 0 | 0 | 0 | 0 | 7 | 1 | 0 | 0 | 0 | 0 | 0 | 0 | 0 | 0 | 0 |

FIG.19

PEAK VOLTAGE VALUES

|  |  | MIDDLE FINGER | INDEX FINGER | THUMB |
|---|---|---|---|---|
| SYMBOLS | O | 0.414 | 1.724 | 1.242 |
|  | / | 0.237 | 0.833 | 0.892 |
| NUMERALS | 1 | 0.402 | 1.281 | 0.828 |
|  | 2 | 0.471 | 1.165 | 1.017 |
|  | 3 | 0.366 | 1.272 | 0.833 |
|  | 4 | 0.512 | 1.506 | 1.055 |
|  | 5 | 0.452 | 1.384 | 1.109 |
|  | 6 | 0.451 | 1.551 | 1.110 |
|  | 7 | 0.494 | 1.545 | 1.022 |
|  | 8 | 0.439 | 1.357 | 0.968 |
|  | 9 | 0.419 | 1.578 | 1.031 |
|  | 0 | 0.333 | 1.117 | 0.824 |

FIG.20

ZONE VOLTAGE VALUES FOR 「0」

|  |  | MIDDLE FINGER | INDEX FINGER | THUMB |
|---|---|---|---|---|
| SYMBOLS |  | ○ | 0 | 1 | 2 |
| ZONE NOS. | K 1 | 0.000 | 0.629 | 0.562 |
|  | K 2 | 0.136 | 0.773 | 0.624 |
|  | K 3 | 0.135 | 0.802 | 0.693 |
|  | K 4 | 0.128 | 0.824 | 0.734 |
|  | K 5 | 0.110 | 0.844 | 0.762 |
|  | K 6 | 0.110 | 0.917 | 0.807 |
|  | K 7 | 0.127 | 1.040 | 0.909 |
|  | K 8 | 0.171 | 1.210 | 1.042 |
|  | K 9 | 0.232 | 1.452 | 1.165 |
|  | K 10 | 0.299 | 1.630 | 1.215 |
|  | K 11 | 0.370 | 1.724 | 1.242 |
|  | K 12 | 0.399 | 1.719 | 1.241 |
|  | K 13 | 0.410 | 1.604 | 1.195 |
|  | K 14 | 0.414 | 1.416 | 1.083 |
|  | K 15 | 0.368 | 1.182 | 0.874 |
|  | K 16 | 0.266 | 0.907 | 0.583 |

FIG.22

| WEIGHTING VALUE | WRITING TIME | NO.OF HIGHS | | | NO.OF TROUGHS | | | PEAK POSITIONS | | | BOTTOM POSITIONS | | | PEAK VOLTAGE VALUES | | | PATTERN AGREEMENT DEGREES | | | TOTAL SCORE |
|---|---|---|---|---|---|---|---|---|---|---|---|---|---|---|---|---|---|---|---|---|
| SYMBOLS / NUMERALS | | (M) | (I) | (T) | (M) | (I) | (T) | (M) | (I) | (T) | (M) | (I) | (T) | (M) | (I) | (T) | (M) | (I) | (T) | |
| ○ | 1.00 | 1.00 | 1.00 | 1.00 | 1.00 | 1.00 | 1.00 | 1.00 | 1.00 | 1.00 | 1.00 | 1.00 | 1.00 | 1.00 | 1.00 | 1.00 | 1.00 | 1.00 | 1.00 | |
| / | | | | | | | | | | | | | | | | | | | | |
| 1 | | | | | | | | | | | | | | | | | | | | |
| 2 | | | | | | | | | | | | | | | | | | | | |
| 3 | | | | | | | | | | | | | | | | | | | | |
| 4 | | | | | | | | | | | | | | | | | | | | |
| 5 | | | | | | | | | | | | | | | | | | | | |
| 6 | | | | | | | | | | | | | | | | | | | | |
| 7 | | | | | | | | | | | | | | | | | | | | |
| 8 | | | | | | | | | | | | | | | | | | | | |
| 9 | | | | | | | | | | | | | | | | | | | | |
| 0 | | | | | | | | | | | | | | | | | | | | |

NOTE: M, I, AND T DENOTE MIDDLE FINGER, INDEX FINGER, AND THUMB, RESPECTIVELY.

FIG.24

| WEIGHTING VALUE / SYMBOLS / NUMERALS | WRITING TIME | NO. OF HIGHS (M) | (I) | (T) | NO. OF TROUGHS (M) | (I) | (T) | PEAK POSITIONS (M) | (I) | (T) | BOTTOM POSITIONS (M) | (I) | (T) | PEAK VOLTAGE VALUES (M) | (I) | (T) | PATTERN AGREEMENT DEGREES (M) | (I) | (T) | TOTAL SCORE / EVALUATED RESULTS |
|---|---|---|---|---|---|---|---|---|---|---|---|---|---|---|---|---|---|---|---|---|
| O | 1.23 | 1.0 | 0.8 | 0.6 | 1.0 | 0.76 | 1.16 | 1.08 | 1.00 | 1.16 | 1.16 | 1.16 | 1.24 | 0.75 | 1.3 | 1.05 | 0.8 | 1.36 | 1.36 | 6.53 |
| 1 | 1.23 | 0.25 | 0.11 | 0.16 | 0.64 | 0.96 | 0.76 | 0.23 | 0.01 | 0.05 | 0.01 | 0.00 | 0.02 | 0.75 | 0.00 | 0.75 | 0.28 | 0.00 | 0.31 | 5.22 |
| 2 | 0.05 | 0.16 | 0.03 | 0.00 | 0.75 | 0.91 | 1.02 | 0.19 | 0.01 | 0.00 | 0.02 | 0.08 | 0.03 | 0.51 | 0.33 | 0.83 | 0.38 | 0.21 | 0.22 | 7.55 |
| 3 | 0.80 | 0.32 | 0.02 | 0.02 | 0.75 | 1.09 | 1.06 | 0.12 | 0.00 | 0.02 | 0.01 | 0.04 | 0.12 | 0.75 | 0.99 | 0.61 | 0.40 | 0.26 | 0.19 | 20.34 |
| 4 | 1.23 | 0.81 | 0.23 | 0.74 | 0.59 | 0.92 | 0.85 | 0.39 | 0.19 | 0.66 | 0.03 | 0.24 | 0.25 | 0.75 | 1.13 | 1.05 | 1.92 | 2.97 | 7.08 | 10.52 |
| 5 | 1.23 | 0.92 | 0.59 | 0.83 | 0.54 | 0.33 | 0.64 | 0.13 | 0.65 | 0.29 | 0.00 | 0.48 | 0.06 | 0.75 | 1.03 | 0.80 | 0.33 | 0.35 | 0.57 | 8.45 |
| 6 | 0.70 | 0.58 | 0.60 | 0.99 | 0.00 | 0.02 | 0.00 | 0.60 | 0.76 | 0.00 | 0.14 | 0.01 | 0.00 | 0.75 | 0.15 | 1.05 | 1.75 | 0.01 | 0.34 | 5.34 |
| 7 | 0.00 | 0.63 | 0.12 | 0.91 | 0.00 | 0.00 | 0.01 | 0.06 | 0.02 | 0.00 | 0.07 | 0.00 | 0.00 | 0.75 | 0.61 | 1.05 | 0.72 | 0.08 | 0.26 | 0.00 |
| 8 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 7.12 |
| 9 | 0.26 | 0.97 | 0.42 | 0.79 | 0.02 | 0.00 | 0.03 | 0.72 | 0.85 | 0.10 | 0.00 | 0.02 | 0.01 | 0.75 | 0.00 | 1.05 | 0.50 | 0.00 | 0.65 | 7.48 |
| 0 | 0.82 | 0.26 | 0.08 | 0.34 | 0.46 | 0.91 | 0.44 | 0.35 | 0.00 | 0.03 | 0.02 | 0.01 | 0.00 | 0.75 | 0.71 | 1.05 | 0.65 | 0.15 | 0.47 | 9.80 |
|   | 0.98 | 0.58 | 0.47 | 0.55 | 0.69 | 0.16 | 0.95 | 0.21 | 0.70 | 0.21 | 0.09 | 0.23 | 0.02 | 0.75 | 0.00 | 1.05 | 1.03 | 0.00 | 1.12 | 0.00 |
|   | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 |

NOTE: M, I, AND T DENOTE MIDDLE FINGER, INDEX FINGER, AND THUMB, RESPECTIVELY.

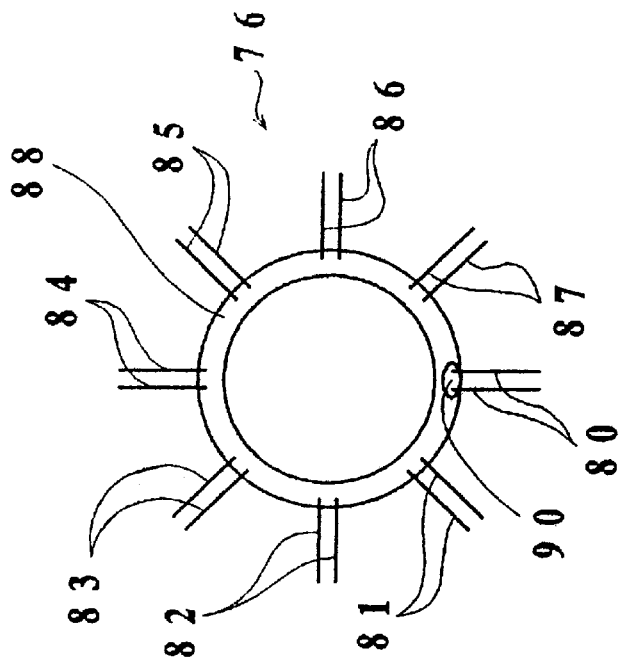
FIG. 26C
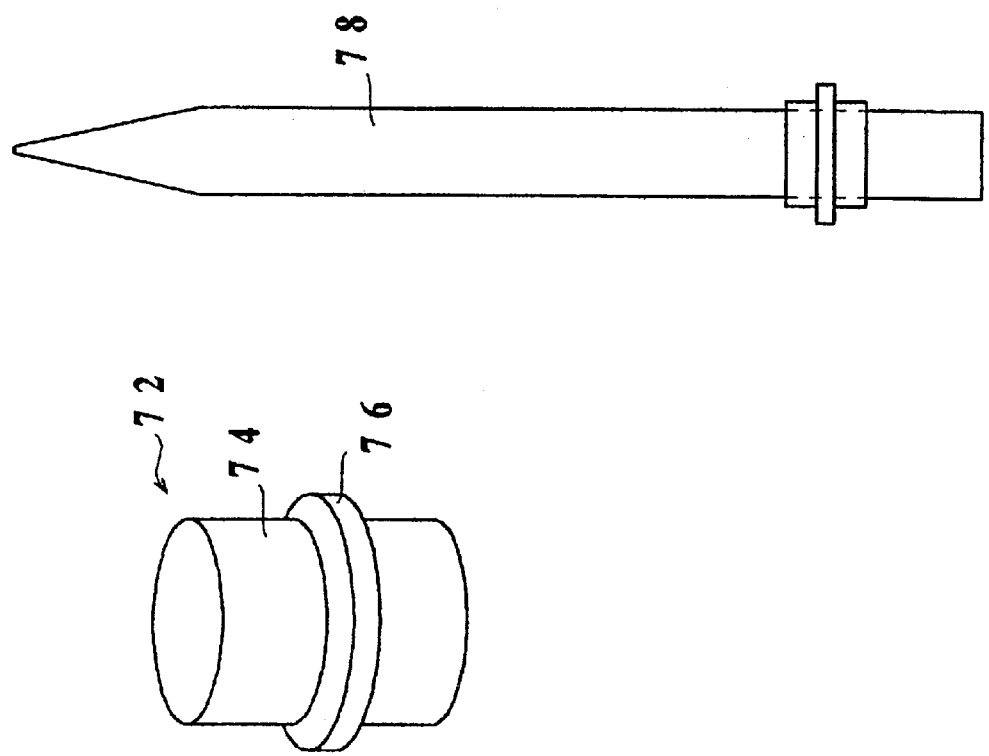
FIG. 26B
FIG. 26A

PEN-GRIP TYPE OF INPUT APPARATUS USING FINGER PRESSURE AND GRAVITY SWITCHES FOR CHARACTER RECOGNITION

FIELD OF THE INVENTION

This invention relates generally to a character input device, and more particularly to an input device capable of correctly recognizing and inputting hand-written letters and symbols upon being written.

BACKGROUND ART

Optical character readers (OCRs) have been utilized to correctly recognize and input letters on manuscripts. With the OCR, letters may be input without manual input work using an input device such as a keyboard.

When inputting an English manuscript for instance through manual input work, an operator reads the letters and then manually inputs the read letters through the keyboard. Here, the speed of reading the English manuscript and the input speed through the keyboard largely depend an the linguistic proficiency and the keyboard operating ability of the operator.

In contrast, in the input work with the OCR, the English manuscript is read as graphic information with an optical device such an a scanner. Then, the graphic information is analyzed with a CPU according to a predetermined program, and the information read as graphic image is recognized as a specific character. Since the recognized characters are taken into the device, no manual work is required. Therefore, characters may be input without being affected by the operator's linguistic proficiency or keyboard operating ability.

The OCR can recognize not only characters but also numerals and symbols. Therefore, the OCR is utilized for recognizing postal codes (numerals) on letters or postcards, and checking examination papers (recognizing symbols and numerals) as well as recognizing and inputting characters.

On the other hand, there is an input device such an a pen input device, other than the OCR, with which characters written with a special electronic pen on a liquid crystal screen having transparent electrodes are recognized and input. With the pen input device, input of characters is made upon the characters being written. Therefore, the pen input device requires no separate recognition work with OCR, using a scanner or the like. Also, since no input work through the keyboard is required, the pen input device is attracting attention as a speedy input device.

However, the conventional pen input device has the following problems.

That is to say, since the OCR performs the reading optically, the surface condition of the manuscript on which the characters are written may become a problem. For example, when checking examination papers utilizing the OCR, recognition may not be performed correctly if answering marks such as [O] and [X], or score numerals are overlapped with question sentences.

To avoid such a problem, a scoring box may be provided separately on the answer paper so that the scoring box may be separately recognized with the OCR. In that case, however, the scoring box must always be provided and moreover the reading position must be registered in the OCR. Such preparation work before the recognition work is cumbersome.

Furthermore, the recognition may become uncertain when there are traces of rubber eraser, leaked ink, blurred ink, or breakage or wrinkles on the paper.

Another problem is that, since the checking is followed by the recognition with the OCR, the input work cannot be done speedily in parallel with the checking.

With the pen input device on the other hand, since the data input is done with a special electronic pen, a liquid crystal panel, etc., existing hardware cannot be utilized in the recognition work, and a special computer system is required. This results in a high cost of the product.

DISCLOSURE OF THE INVENTION

The object of the invention made in view of the above is to provide an input device capable of solving the problems described above, and correctly recognizing and inputting hand-written characters upon being written, without using an input device such as the optical character reader or a keyboard.

The pen-grip type input device and the input device of the invention are provided with; pressure detecting means for detecting the finger pressure of the writer, and analyzing means for obtaining a unit waveform from the variation in the detected pressure and for recognizing characters by comparing the unit waveform with previously learned and stored characters. Therefore, hand-written characters may be accurately and speedily recognized and input without using an input device such as an OCR or a keyboard.

The pen-grip type input device and the input device of the invention are further provided with held state recognizing means for recognizing the held state of the writing instrument by obtaining an output from gravity direction detecting means disposed to surround the writing instrument. Therefore, the held state of the writing instrument is recognized so that the pressure detecting means in correctly associated with fingers.

The pen-grip type of auxiliary input device and the auxiliary input device of the invention are provided with at least one gravity direction detecting means disposed around an input pen of the pen input device so that a change in the tilt angle (rotary angle about the pen point) of the input pen in detected. Also, input function selecting means is provided for selecting input functions of the pen input device according to the output from the gravity direction detecting means. Therefore, input functions may be selected simply by changing the rotary angle of the input pen.

BRIEF DESCRIPTION OF THE DRAWINGS

FIG. 2A is an oblique view of the pen-grip.

FIG. 2B is a view of the pen-grip as seen from the direction of the pen point.

FIG. 3A is a cross-sectional view of the pen-grip of FIG. 2.

FIG. 3B is a view of a strain gauge 28c mounted on the back surface of a plate spring 62c.

FIGS. 6A, 6B, and 6C illustrate the held state of the pen-grip and the on/off state of the mercury switch.

FIG. 7 is a chart showing the held state of the pen-grip and the on/off state of the mercury switch, with the held state A corresponding to FIG. 6A, the hold state B corresponding to FIG. 6B, and the held state C corresponding to FIG. 6C.

FIG. 8 is a chart showing the relationship between the strain gauges and the fingers, with the held state A corresponding to FIG. 6A, with the held state B corresponding to FIG. 6B, and with the held state C corresponding to FIG. 6C.

FIG. 9A shows the strain gauge output representing the change in the middle finger pressure, and FIG. 9B shows the strain gauge output representing the change in the index finger pressure, and FIG. 9C shows the strain gauge output representing the change in the thumb pressure.

FIG. 14 is a chart showing a waveform characteristic (writing time) stored as learning data.

FIG. 15 shows a waveform characteristic (number of highs) stored as learning data.

FIG. 16 shows a waveform characteristic (number of troughs) stored as learning data.

FIG. 17 shows a waveform characteristic (positions of peaks) stored as learning data.

FIG. 18 shows a waveform characteristic (positions of bottoms) stored as learning data.

FIG. 19 shows a waveform characteristic (peak voltage values) stored as learning data.

FIG. 20 shows a waveform characteristic (voltage among zones) stored as learning data.

FIG. 22 is an evaluation table used when evaluating waveform characteristics.

FIG. 24 is the evaluation table when the waveform evaluation is coupled.

FIG. 26A is an oblique view of an auxiliary pen-grip type of input device as an embodiment of the invention, with FIG. 26B showing a plan view of an electronic pen provided with the pen-grip, and with FIG. 26C showing a plan view of a mercury switch.

PREFERRED EMBODIMENT OF THE INVENTION

Figure 1:
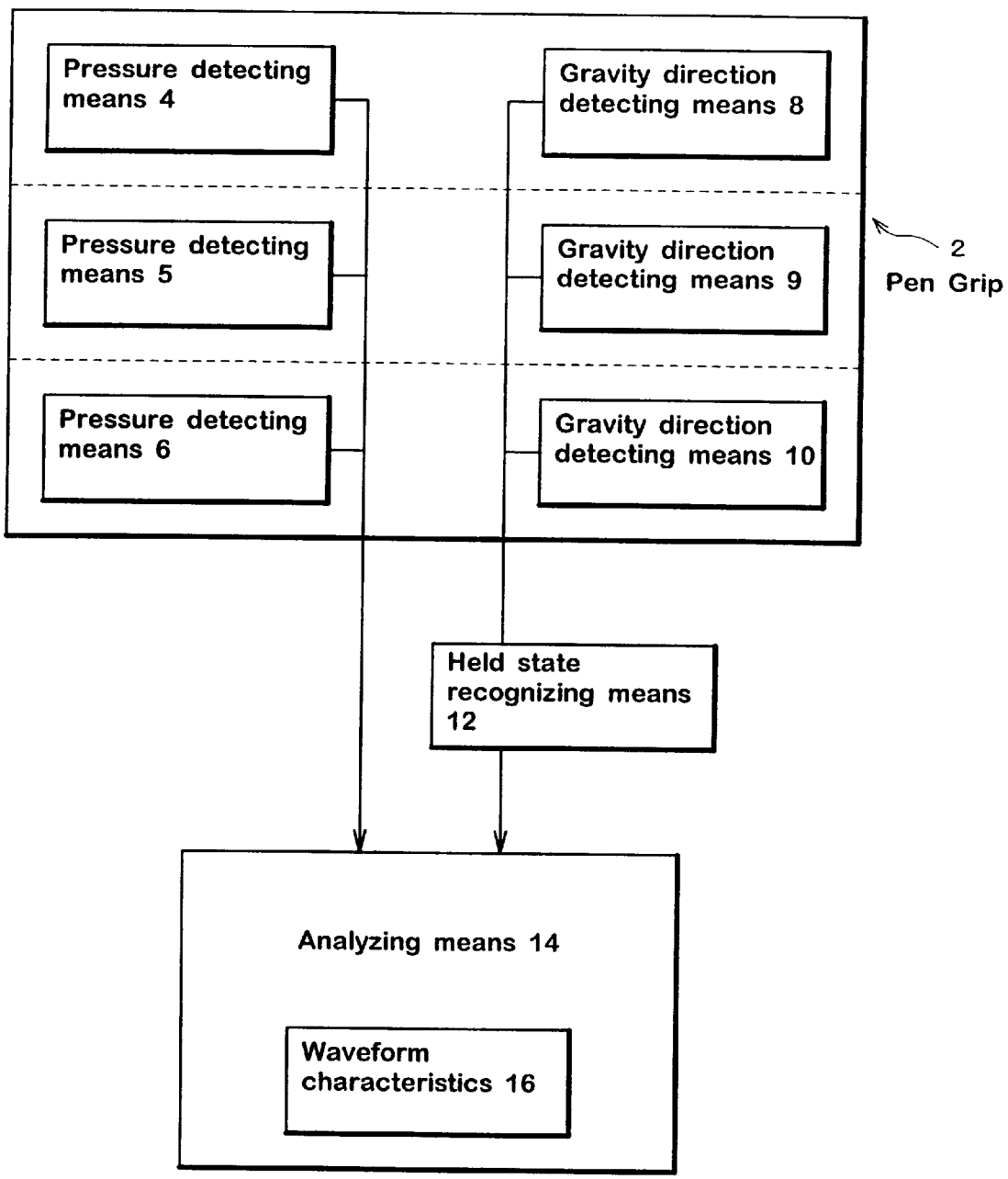
FIG. 1 is a block diagram of a configuration of a pen-grip type of input device as an embodiment of the invention.

A pen-grip type of input device as an embodiment of the invention will be hereinafter described in reference to appended drawings. FIG. 1 is a block diagram of a configuration of a pen-grip type of input device. A pen-grip 2 is mounted on a writing instrument. When characters such as [＊], [ㄥ], [ヶ], [ス], and [ホ]; numerals such as [1], [2], [3], graphic symbols such as [O], [X], [Δ], and [□]; and signs such as [+] and [−] are written with this writing instrument, pressure detecting means 4, 5, and 6 measure finger pressures applied to the writing instrument.

The pressures measured with the pressure detecting means 4, 5, and 6 are converted into electric signals and supplied as waveforms to analyzing means 14. The analyzing means 14 analyzes the supplied waveforms and determines which waveform corresponds to which character, etc. Waveform characteristics 16 representing features of respective characters are stored in advance in the analyzing means 14. A given waveform is divided into unit waveforms each corresponding to a single character, etc. and compared with waveform characteristics of respective characters, etc. stored in advance.

The corresponding relationship between the pressure detecting means 4, 5, and 6 and the fingers will change when the manner of holding the pen-grip 2 in changed. Then, the corresponding relationship is determined with gravity direction detecting means 8, 9, and 10 and held state recognizing means 12. The gravity direction detecting means 8, 9, and 10 are sensors for detecting the direction of gravity, which are mercury switches in this embodiment and provided on the same plane on which the pressure detecting means 4, 5, and 6 are disposed so as to be set to "on" or "off" depending on the tilt of the plane. The held state recognizing means 12 collectively determines the states of the gravity direction detecting means 8, 9, and 10 and determines which of them corresponds to which finger.

A specific construction of the pen-grip 2 will be described in reference to FIG. 2. The pen-grip 2 includes a support body 64 of a triangular column shape having three faces 64a, 64b, and 64c. A writing instrument 26 in inserted in the interior of the support body 64. The support body 64 is provided with a recess in which are disposed mercury switches 29a, 29b, and 29c directed generally at right angles to the axial direction of the writing instrument 26.

Figures 4A, 4B:
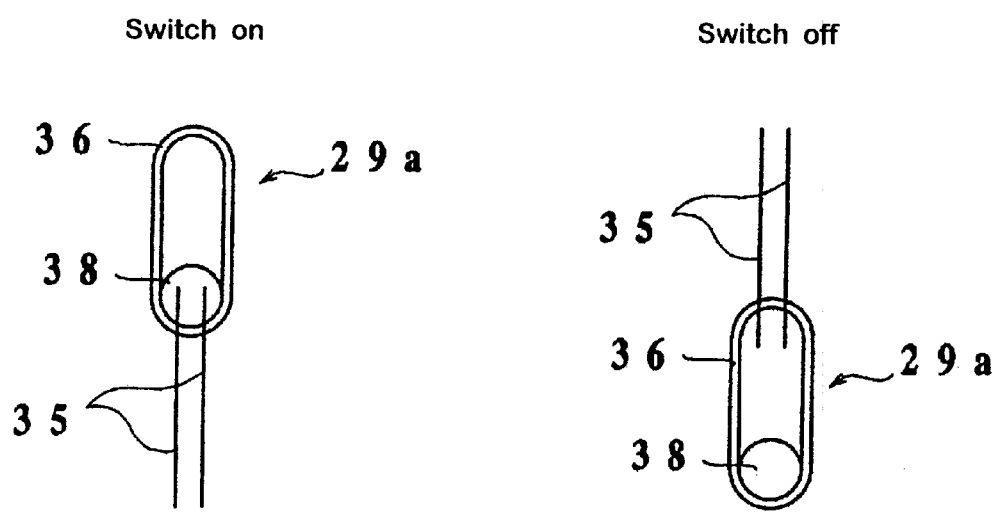
FIG. 4A is a view of a mercury switch showing the on state of the mercury switch.
FIG. 4B is a view of the mercury switch showing the off state.

The mercury switches 29a, 29b, and 29c are respectively mounted on the faces 64a, 64b, and 64c. The mercury switch 29a is of a constitution shown in FIG. 4 with mercury 38 contained in a glass container 36 having two leads 35. Mercury 38 can move freely within the glass container 36. When the mercury switch 29a is in the state of FIG. 4A, the two leads are interconnected with mercury 38 so as to function as a switch. The other mercury switches 29b and 29c are of the same constitution.

The three faces 64a, 64b, and 64c of the support body 64 are respectively provided with elastic members or plate springs 62a, 62b, and 62c secured with screws 66a, 66b, and 66c. At the ends of the plate springs 62a, 62b, and 62c are provided contact members 60a, 60b, and 60c of acrylic material of about the same thickness with that of the support body 64. As a result, as shown in FIG. 3A, spaces 72a, 72b, and 72c are formed between the central portions of the plate springs 62a, 62b, and 62c and the writing instrument 26.

As shown in FIG. 3B, on the back side of the plate spring 62c is bonded a pressure detecting means or a strain gauge 28c. Back sides of the plate springs 62a and 62b are also provided with strain gauges 28b and 28b respectively in a similar manner. Therefore, outputs are obtained from the strain gauges 28b, 28b, and 28c when the plate springs 62a, 62b, and 62c deform according to the finger pressures.

Figure 5:
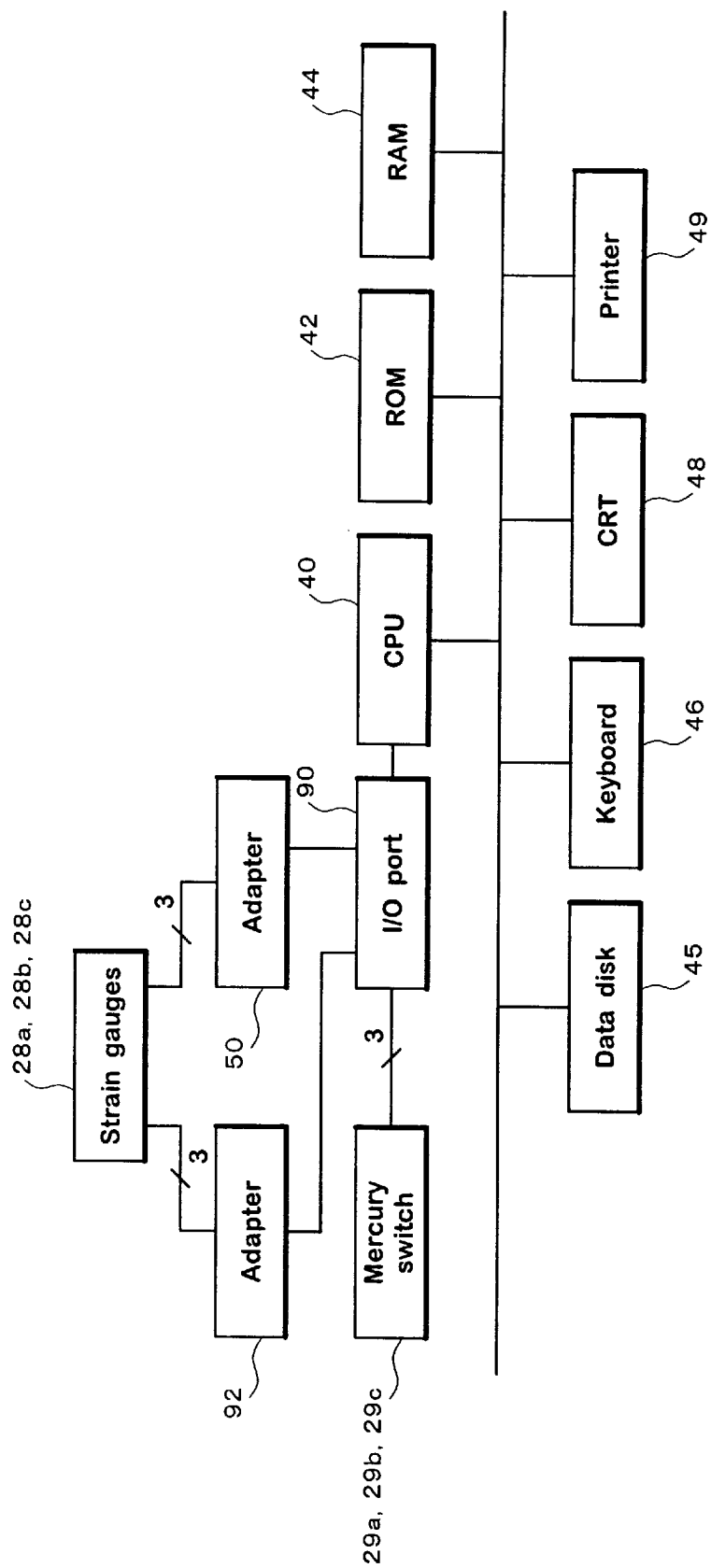
FIG. 5 shows a hardware schematic of the pen-grip type of input device as an embodiment of the invention.

An example of a hardware in which the function of each block shown in FIG. 1 is realized by use of CPU is shown in FIG. 5. To the CPU 40 are connected the strain gauges 28a, 28b, and 28c, the mercury switches 29a, 29b, and 29c, a ROM 42, a RAM 44, a data disk 45, a keyboard 46, a CRT 48, and a printer 49. The CPU 40 controls each part according to programs stored in the ROM 42.

In the ROM 42 or the RAM 44 is stored a program or the like with which the manner of recognizing written characters is specified. The RAM 44 stores the waveforms or the like of the written characters and output from the strain gauges 28a, 28b, and 28c. The RAM 44 also stores output from the mercury switches 29a, 29b, and 29C. The data disk 45 stores waveform characteristics learned in advance. The keyboard 46 is used for inputting commands when the commands are required for proceeding with the recognition work. The CRT 48 displays graphics required for proceeding with the recognition work. The printer 49 prints recognized characters, etc. on recording paper sheets.

The process of inputting and recognizing characters, etc. using the pen-grip type of input device when symbols such as [O] and [/] and numerals [1]–[9] are written will now be described. (In the following description, the term symbols refers to symbols such as [O] and [/], and the term numerals refers to the numerals [1]–[9].) The pen-grip 2 in mounted on the writing instrument and symbols and characters are written while the plate spring portion of the pen-grip 2 in held with the middle finger, index finger, and thumb.

Here, the three fingers are made to come in contact with the three plate springs 62a, 62b, and 62c respectively. The corresponding relationship between the fingers and the plate springs 62a, 62b, and 62c may be arbitrary. For example, it may be arranged that the middle finger comes in contact with the plate spring 62a, the index finger with the plate spring 62b, and the thumb with the plate spring 62c. Alternatively, it may be arranged that the middle finger comes in contact with the plate spring 62b, the index finger with the plate spring 62c, and the thumb with the plate spring 62a.

In the recognition process with the pen-grip type of input device, the corresponding relationship between the plate springs 62a, 62b, and 62c, namely the strain gauges 28a, 28b, and 28c, and the middle finger, index finger, and thumb is first determined an follows.

The state in which the writing instrument with the pen-grip is held in the palm is defined as the held state. The held state is classified into three states: held state A, held state B, and held state C shown in FIG. 6. In the held state A, the mercury switch 29a is on and the mercury switch 29b is "off". The mercury switch 29c may be switched "on" or "off" depending on slight tilt of the pen-grip. When this came is represented with "–," the "on" and "off" states of the mercury switches 29a, 29b, and 29c in the held states A, B, and C are as shown in FIG. 7.

In order to determine which of the held states A, B, and C the pen-grip 2 is in while in the writer's hand, the "on" and "off" state of the three mercury switches are determined according to the following rule. (1): The held state is A if the mercury switch 29a is on and the mercury switch 29b is "off". (2): The held state is C if the mercury switch 29a is on, the mercury switch 29b is "on", and the mercury switch 29c is "off". (3): The held state is B if the mercury switch 29a is "off" and the mercury switch 29c is "on". (4): The held state is C if the mercury switch 29c is "off" and the mercury switch 29b is "on" when the mercury switch 29a is "off". Cases other than the above are regarded as not being in the normal written state.

Information on the "on" or "off" state of the mercury switches 29a, 29b and 29c is given as binary information to the CPU 40. The CPU 40 determines the held state of the pen-grip 2 according to the rule described above, and then determines the corresponding relationship between the strain gauges 28a, 28b and 28c and the middle finger, index finger and thumb. The determined relationship is stored in the RAM 44.

Once the corresponding relationship between the strain gauges 28a, 28b, and 28c and the middle finger, index finger and thumb is determined, work for analyzing the characteristics of the written symbols and characters is carried out an follows.

The period of time for writing, namely the period of time during which pressure is applied to the strain gauges 28a, 28b, and 28c, and the finger pressure vary depending on the symbols and characters written. For instance, a longer time is required for the numeral [5] than [1] and the pressures on the middle finger, index finger and thumb vary widely.

The strain gauges 28a, 28b, and 28c can detect such variations in the pressure electrically. FIG. 9 is a graph showing the pressure changes in the pressures of the middle finger A, index finger B and thumb C detected with the strain gauges 28a, 28b, and 28c when a single symbol or character is written. The changing pattern in pressure is different from finger to finger.

Figure 10A:
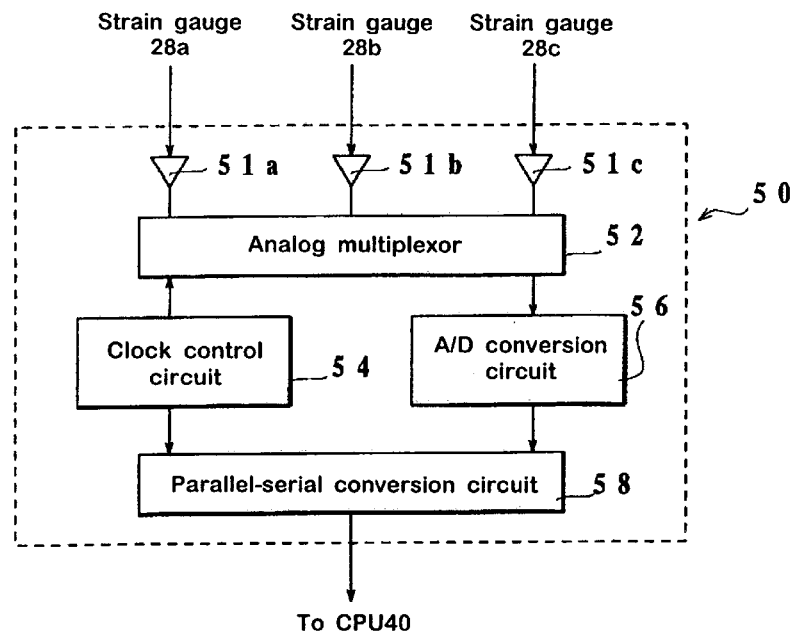
FIGS. 10A and 10B are views showing the constructions of adapters 50 and 92 for giving electric changes in the strain gauges to the CPU.

The changes in the electrical amounts outputted from the strain gauges 28a, 28b, and 28c are digitally processed with an adapter 50 shown in FIG. 10A and given to the CPU 40. The adapter 50 comprises amplifiers 51a, 51b, and 51c, an analog multiplexer 52, a clock control circuit 54, an A/D conversion circuit 56, and a parallel-to-serial conversion circuit 58.

The amplifiers 51a, 51b, and 51c carry out analog processing such as adjusting the offset and gain, and converts outputs from the strain gauges 28a, 28b, and 28c into voltage changes. The analog multiplexer 52 sequentially switches the outputs from the strain gauges 28a, 28b, and 28c to be given to the A/D conversion circuit 56 according to the clock signals from the clock control circuit 54.

The A/D conversion circuit 56 holds a voltage for a certain period of time with the clock (sampling pulses) and outputs the input voltage as a digital signal. The parallel-to-serial conversion circuit 58 converts the currently selected voltage values of the strain gauges 28a, 28b, and 28c into a serial data. The CPU 40 receives the serial data through an I/O port 90 and stores it in the RAM 44 for each of the strain gauges 28a, 28b, and 28c.

Figure 10B:
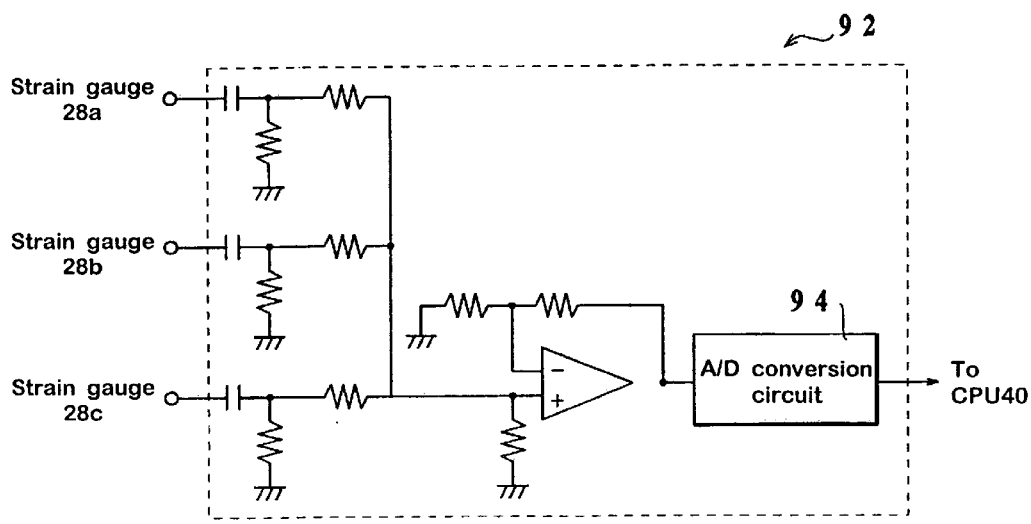

The outputs from the strain gauges 28a, 28b, and 28c are also given to an adapter 92 shown in FIG. 10B. The adapter 92 differentiates each of the outputs, adds them up, and converts the added value into digital data. The interval of sampling in the A/D conversion circuit 94 is made the same as that of the A/D conversion circuit 56 of the adapter 50.

Figure 11:
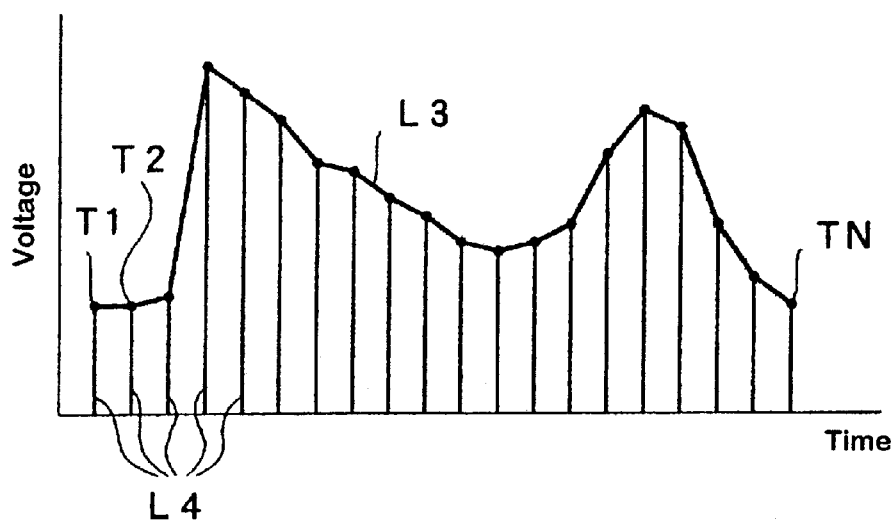
FIG. 11 shows a reproduced waveform of the strain gauge output reproduced with the CPU.

Next, the analyzing process of the CPU 40 will be described. The CPU 40 determines which of the data of the strain gauges 28a, 28b, and 28c stored in the RAM 44 corresponds to which finger according to the outputs from the mercury switches 29a, 29b, and 29c (Refer to FIG. 8.) FIG. 11 shows a graph of outputs of the strain gauge corresponding to the middle finger (referred to as reproduced waveform L3). The reproduced waveform L3 is formed by connecting the voltage values T1, . . . , TN obtained from the sampling pulses. The interval between the vertical lines L4 shows the interval between the sampling pulses. By the way, when a single symbol or character is input, the number of the reproduced waveforms L3 to be obtained is three, corresponding to the strain gauges 28a, 28b, and 28c.

The reproduced waveform L3 does not necessarily correspond to a single symbol or character but extended according to the number of symbols and characters written. Therefore, it is necessary to make the reproduced waveform correspond to a single symbol or character. In order to do so, first the reproduced waveform L3 is discriminated in two states; a non-written state in which the writing instrument is held but writing has not been made, and a written state in which writing has been made with the writing instrument.

Figure 12A:
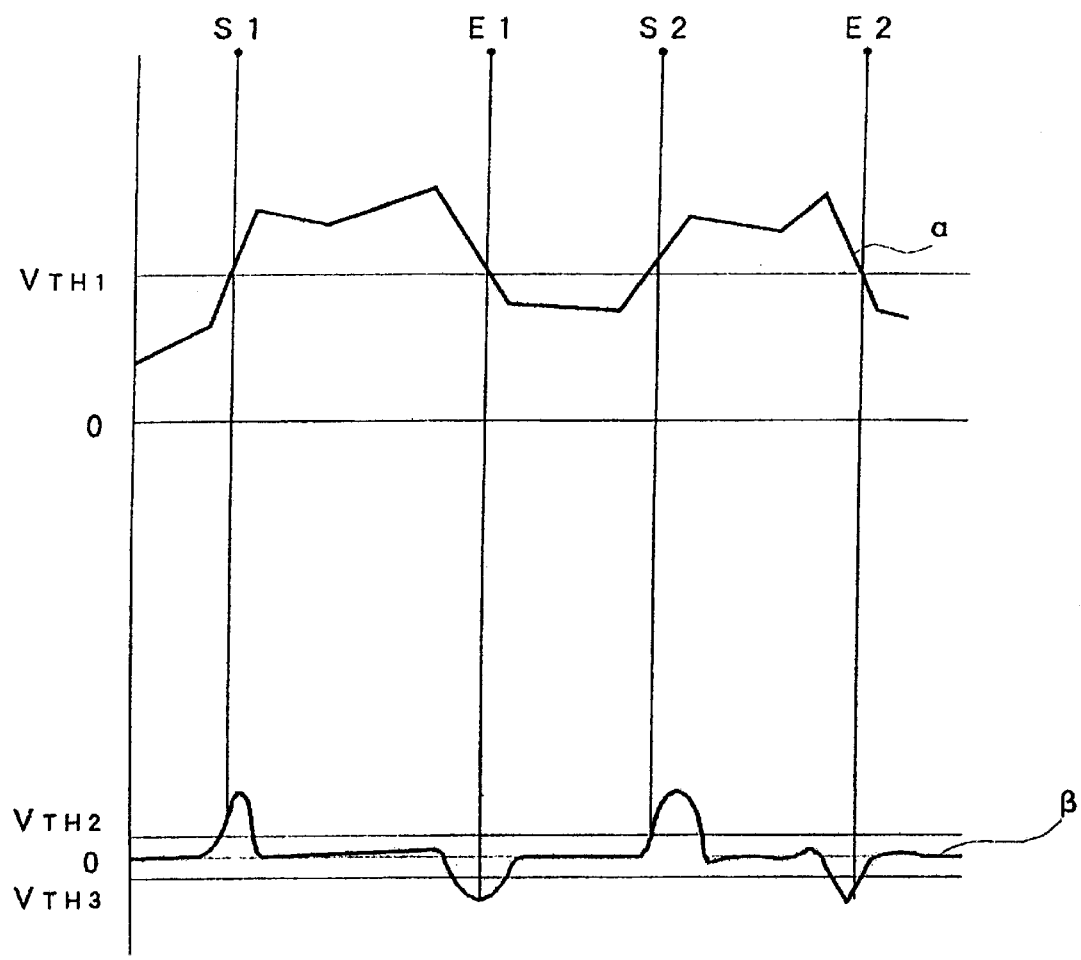
FIG. 12A is a view showing starting and end points of writing.

The method of discriminating the reproduced waveform L3 into the non-written waveform L5 representing the non-written state and the written waveform L6 representing the written state will be described in reference to FIG. 12A. A waveform α in FIG. 12 represents the output waveform from the strain gauge 28a stored in the RAM 44. A waveform β represents the output waveform from the adapter 92 stored in the RAM 44, namely the resultant waveform obtained by adding up the differentiations of the outputs from the strain gauges. The CPU 40 determines the writing start time points S1, S2, . . . when the output voltage a from the strain gauge 28a exceeds a threshold value $V_{TH1}$ and also the differential total waveform β exceeds the threshold value $V_{TH2}$. Also the CPU 40 determines the writing and time points E1, E2, . . . when the output voltage a from the strain gauge 28a falls below the threshold value VTH1 and also the differential total waveform β is smaller than the threshold value $V_{TH3}$.

By the way, the writing start time point and the writing end time point may be determined according to only whether or not the output voltage β of the strain gauge 28a has exceeded the threshold value VTH1. In that case, the determination is less accurate but the adapter 92 becomes unnecessary so that the circuit maybe simplified.

Figure 12B:
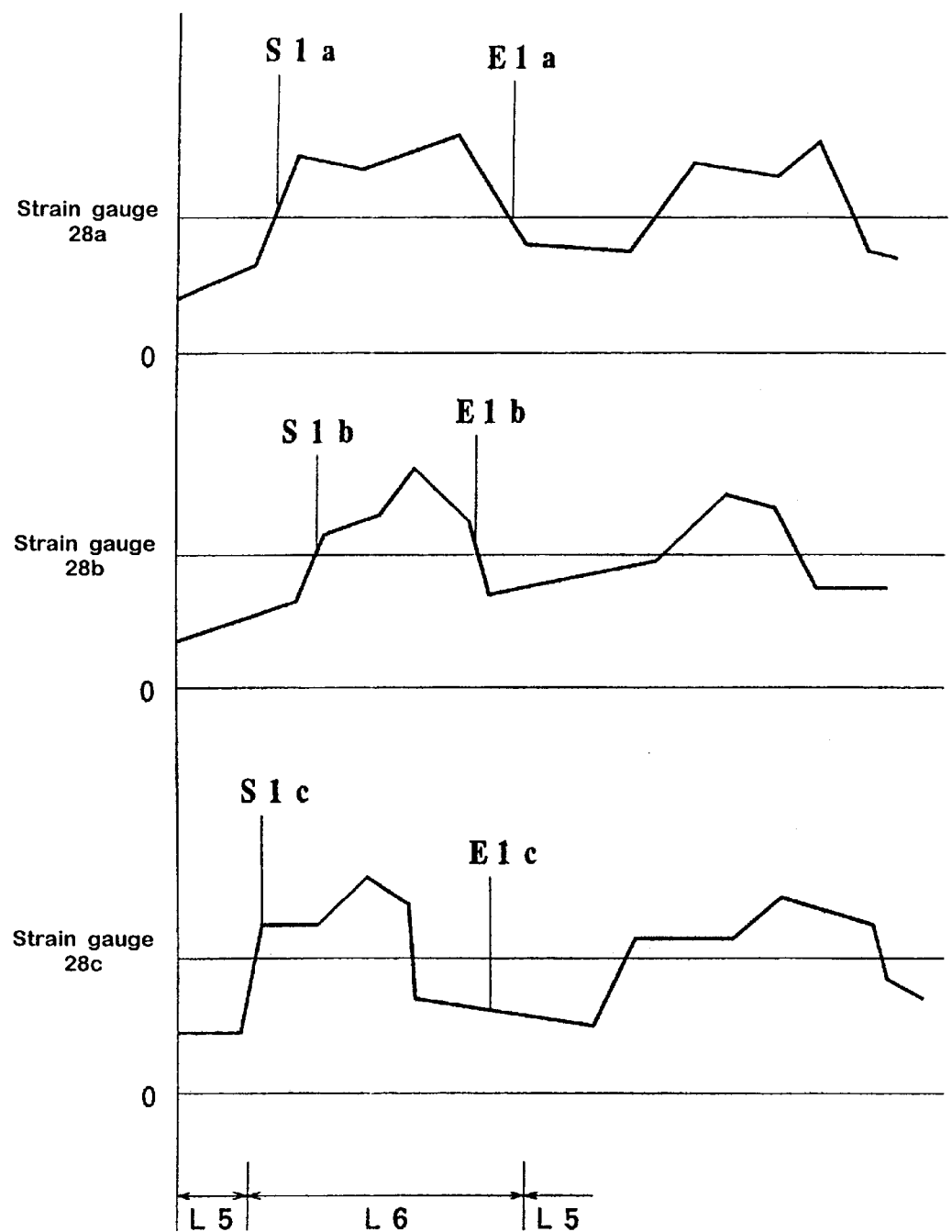
FIG. 12B shows separate waveforms representing a non-writing state and a writing state.

The above process is carried out also for the outputs from other strain gauges 28b and 28c to calculate the writing start point and the writing end point. The calculated results are shown in FIG. 12B. The CPU 40 determines that the written state is started at the writing start time point which the earliest of the writing start time points S1a, S1b, and S1c for the three strain gauges 28a, 28b, and 28c. In the example of FIG. 12B, the written state (written waveform L6) is determined as being started at the time point S1c. The non-written state is determined to be started at the writing end time point which is the latest of the writing end time points E1a, E1b, and E1c for the three strain gauges 28a, 28b, and 28c. In the example of FIG. 12B, the non-written state (non-written waveform L5) is determined to be started at the writing end time point E1a.

Figure 13:
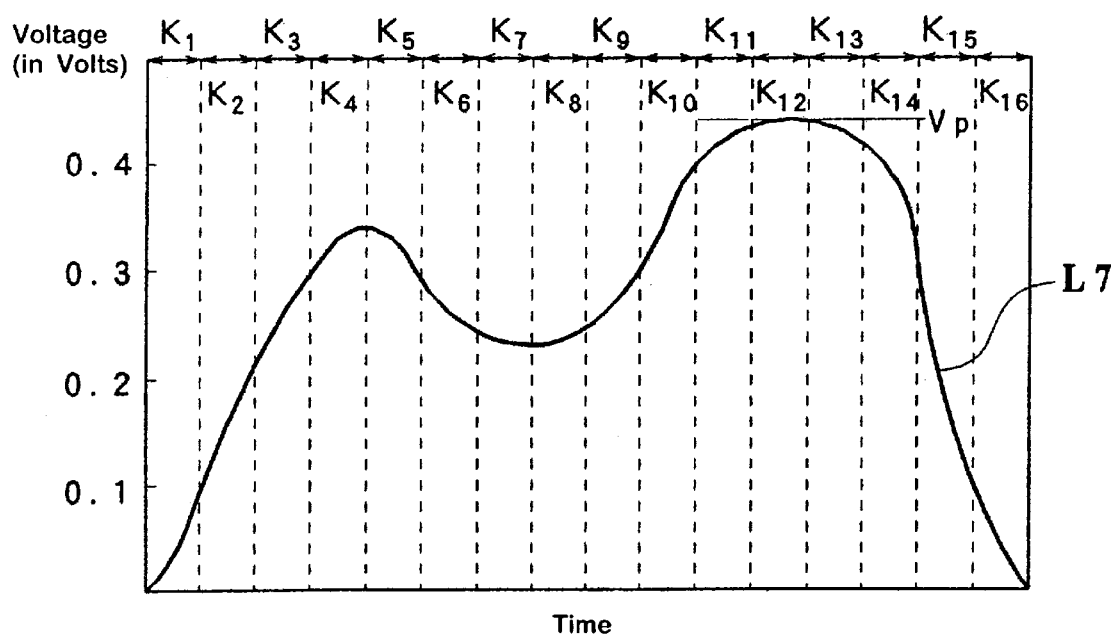
FIG. 13 shows a unit waveform.

Next, time compensation (normalization) and smoothing are carried out for the written waveform L6. The time (namely the number of samplings) of each waveform L6 differs with the writing speed, etc. The time compensation process is the process of normalizing such differences. In this embodiment, the time compensation is carried out by dividing the written waveform L6 into 32 zones K1, K2, . . . , K32. That is to say, as shown in FIG. 13, the division is made with constant intervals irrespective of the duration time of the written waveform L6. The zones K1, K2, . . . , K32 formed in this way are the basic units for analyzing the waveform. By the way, when the writing time is shorter than the predetermined value (namely when the number of samplings is smaller than 32), the written waveform L6 is divided into 16 zones K1, K2, . . . , K16.

While the above embodiment is described with 32 zones, the following description will be made with 16 zones as shown in FIG. 13 for the sake of convenience.

The smoothing is a process for making the waveform smooth by removing minute changes in the voltage. A moving average of the voltage is determined to show the changes in the voltage with the moving average line. By applying the time compensation and the smoothing to the written waveform L6 in this way, a unit waveform L7 is obtained as shown in FIG. 13. By the way, when a single symbol or character is written, three unit waveform L7 are obtained corresponding to the outputs from the strain gauges 28a, 28b, and 28c.

Furthermore, the CPU 40 determines the waveform characteristics of the unit waveforms L7 and stores them in the RAM 44. The waveform characteristics are indices showing the features of the waveforms. In this embodiment, they are, writing time, number of highs, number of troughs, positions of peaks, peak voltage values, bottom positions, and voltage values between zones. Here, the terms "high" and "trough" respectively refer to the convex and concave points where the curvature changes, and the terms "peak" and "bottom" respectively refer to the highest and the lowest of the high and trough. These waveform characteristics will be described below.

The writing time is the time required for writing a single symbol or character and represented with the number of sampling pulses required for forming the unit waveform L7, namely the length of L6 of FIG. 12B.

The number of highs and the number of troughs are respectively the number of convex and concave points where the curvature changes. The unit waveform L7 of FIG. 13 has two highs and one trough.

The peak positions and the bottom positions are respectively convex and concave points in the zones K1, K2, . . . , K16 where the curvature changes. For the unit waveform L7 of FIG. 13, the peak position is in the zone K12 and the bottom is in the zone K7.

The peak voltage value is the value of voltage at its peak, or the value Vp in FIG. 13.

The waveform characteristics obtained through the process described above are compared with the waveform characteristics of the symbols and characters previously learned and stored, such as [O], [/], and numerals [0] through [9]. Learning and storing the waveform characteristics of those symbols and numerals will be described below.

Learning and storing the waveform characteristics are carried out before the recognition work. The writer uses the pen-grip 2 to write the symbols [O] and [/] and numerals [0]–[9], ten times for each. The written symbols and numerals are analyzed and the waveform characteristics of the symbols and numerals are stored in the data disk 45.

As for the writing time, an average writing time from the start to the end of writing a symbol or numeral, the longest writing time, and the shortest writing time are stored using the number of sampling pulses. FIG. 14 shows an example of the stored data.

As for the number of highs, the number of highs appearing in a letter is stored in the form of a table as shown in FIG. 15. (Data are taken for each of the symbols and numerals, [O] and [/] and [0]–[9], and stored.) Referring to the table, it will be seen for the strain gauge which monitors the thumb (one of the strain gauges 28a, 28b, and 28c) when the numeral [1] is written for instance, the number of highs appearing for a letter is one for eight out of ten trials, and zero for two out of ten trials. The number of troughs is stored in a similar manner. FIG. 16 shows an example of the stored data.

As for the peak positions, the zones K1, . . . , K16 where highs exist are stored in the form of a table shown in FIG.

17. Data are taken for each of the symbols and numerals, [O] and [/]and [0]–[9], and stored. Referring to the table, it will be seen for the strain gauge which monitors the thumb (one of the strain gauges 28a, 28b, and 28c) when the numeral [1] is written for instance, the peak position is in the zone K4 for five out of ten trials, in the zone K3 for two out of ten trials, and in the zones K2, K10, and K12 for one out of ten trials. The number of bottoms is stored in a similar manner. FIG. 18 shows an example of the stored data.

The peak voltage values are stored with an average of ten peaks for each finger as shown in FIG. 19.

The voltage value (an average of ten data) for each zone is stored for each finger as shown in FIG. 20. By the way, while FIG. 20 shows data only for the symbol [O], data for other symbols and numerals are stored in a similar manner.

Figure 21:
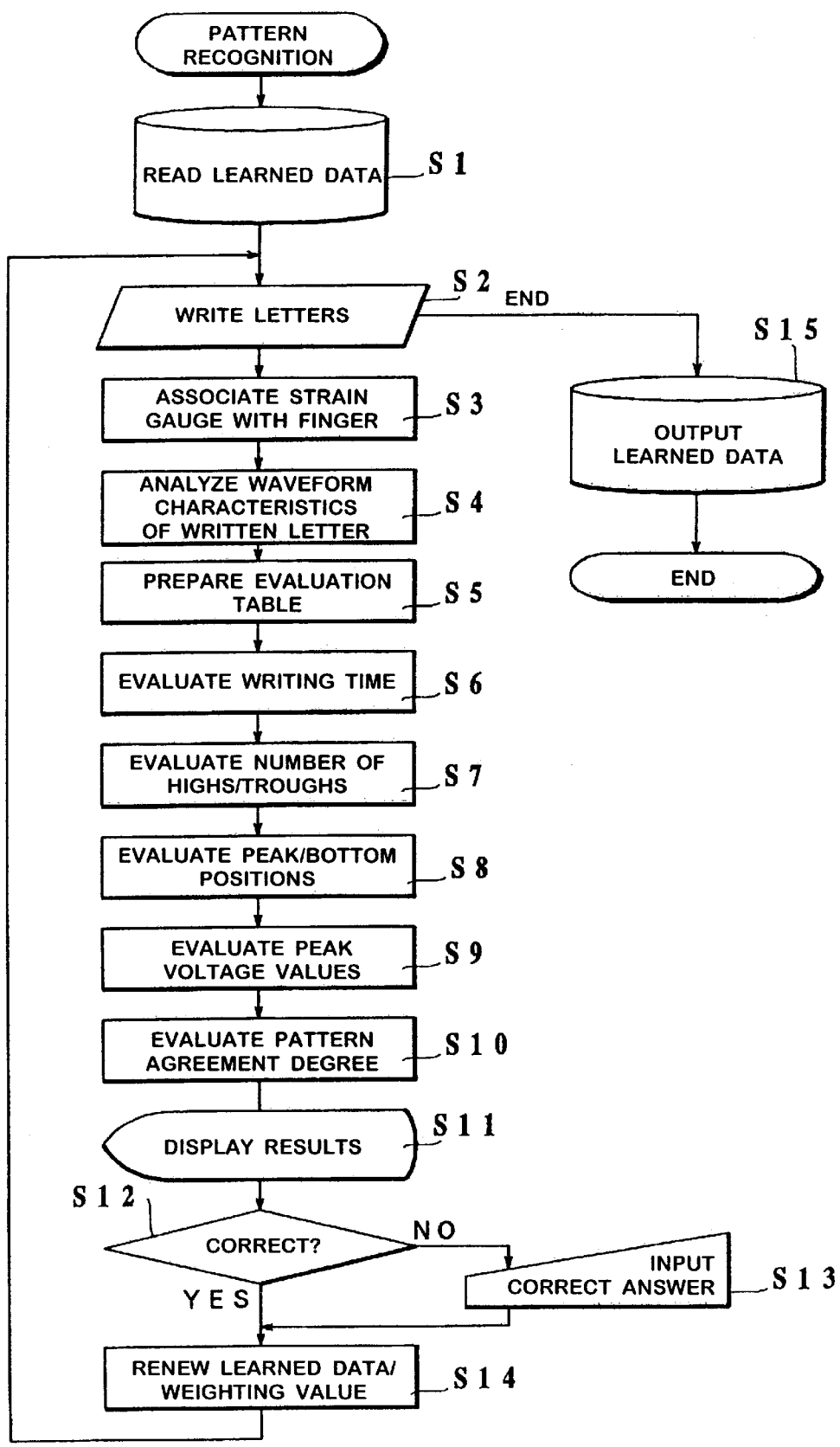
FIG. 21 is a flow chart showing a procedure for recognizing characters input through the pen-grip type of input device.

After storing the learned data as described above, the written symbols and numerals are discriminated according to the learned data. The process of comparing the waveform characteristics of the written symbols and characters with those previously learned and stored will be described in reference to the flow chart shown in FIG. 21. The waveform characteristics of the symbols and numerals, [O] and [/] and [0]–[9] obtained through learning are stored in the data disk 45. The data are read and stored in the RAM 44 (step S1).

When the symbols and characters are written with the writing instrument with the pen-grip 2 (step S2), the corresponding relationship between the strain gauges 28a, 28b, and 28c and the fingers is determined according to the outputs from the mercury switches 29a, 29b, and 29c (step S3). Next, the written waveform and the non-written waveform are discriminated according to the outputs from the strain gauges 28a, 28b, and 28c, and unit waveforms L7 are created for each symbol and character. The waveform characteristics of the unit waveform L7 are analyzed and the current writing time, number of highs, number of troughs, peak positions, bottom positions, peak voltage values, and voltage values in respective zones are determined (step S4).

An evaluation table of FIG. 22 is prepared in the RAM 44 and the comparison is carried out sequentially (step 85). First, the writing time is evaluated (step S6). The writing time (number of sampling pulses) of the current unit waveform L7 is compared with the learned data for the symbols and numerals, [O] and [/] and [0]–[9]. If the difference is within plus and minus 3 on the average, an evaluation score of 0.9 is given. For instance, if the condition of plus and minus 3 is met with the numerals [3] and [8], an evaluation score of 0.9 is given to those numerals.

When the difference is between a value which is less by 3 than the minimum value and a value which is less by 3 than the average, an appropriate agreement score from 0.1 to 0.9 is given according to the degree of agreement. When the difference is between a value which is greater by 3 than the maximum value and a value which is greater by 3 than the average, an appropriate agreement score from 0.1 to 0.9 is given according to the degree of agreement. The scores are stored in the "writing time" box in the evaluation table shown in FIG. 22.

Next, the numbers of highs and troughs are evaluated (step S7). It is assumed that the numbers of highs in the current unit waveform L7 obtained from the strain gauges 28a, 28b, and 28c monitoring the middle finger, index finger, and thumb are respectively 1, 2, and 1. To determine the degree of agreement of the numbers of highs with the learned data shown in FIGS. 15 and 16, the degrees of agreement are calculated.

As an example, a case of determining the degree of agreement with the numeral [1] is described. The number of trials in which a high appears is two out of ten trials for the middle finger. Therefore, the agreement score for the middle finger in $^2/_{10}$ or 0.2. Similarly, the score is $^0/_{10}$ or 0 for the index finger, and $^8/_{10}$ or 0.8 for the thumb.

In other words, when it is assumed that N number of highs appeared in the currently written symbols and numerals, the degree of agreement of the number of highs is determined from the number of trials for obtaining the number/learning data in which N number of highs appeared in the learning data. The scores are stored in the "number of highs" box in the evaluation table shown in FIG. 22.

The number of troughs is evaluated in a similar manner. When it is assumed that N number of troughs appeared in the currently written symbols and numerals, the agreement degree score for the number of troughs can be determined from the number of trials for obtaining the number/learning data in which N number of troughs appeared in the learning data. The scores are stored in the "number of troughs" box in the evaluation table shown in FIG. 22.

Next, peak and bottom positions are evaluated (step S8). It is assumed that the numbers of peak positions in the current unit waveform L7 obtained from the strain gauges 28a, 28b, and 28c monitoring the middle finger, index finger, and thumb are respectively in the zones K7, K4, and K12. To determine the degree of agreement of the numbers of peak positions with the learned data shown in FIGS. 17 and 18, the degrees of agreement are calculated.

As an example, a case of determining the degree of agreement with the numeral [1] is described. The number of trials in which the peak position is in the zone K7 is two out of ten trials for the. middle finger. Therefore, the agreement score for the middle finger is $^2/_{10}$ or 0.2. Similarly, the score is $^3/_{10}$ or 0.5 for the index finger, and $^1/_{10}$ or 0.1 for the thumb.

In other words, when it is assumed that the peak position of the currently written symbols and numerals is in the zone KN, the degree of agreement of the peak position is determined from the number of trials for obtaining the number/ learning data in which the peak position is in the zone KN in the learning data. The scores are stored in the "peak position" box in the evaluation table shown in FIG. 22.

Bottom positions are evaluated in a similar manner. That is to say, when it in assumed that the bottom position of the currently written symbols and numerals is in the zone RN, the degree of agreement of the bottom position is determined from the number of trials for obtaining the number/learning data in which the bottom position is in the zone KN in the learning data. The scores are stored in the "bottom position" box in the evaluation table shown in FIG. 22.

Figure 23:
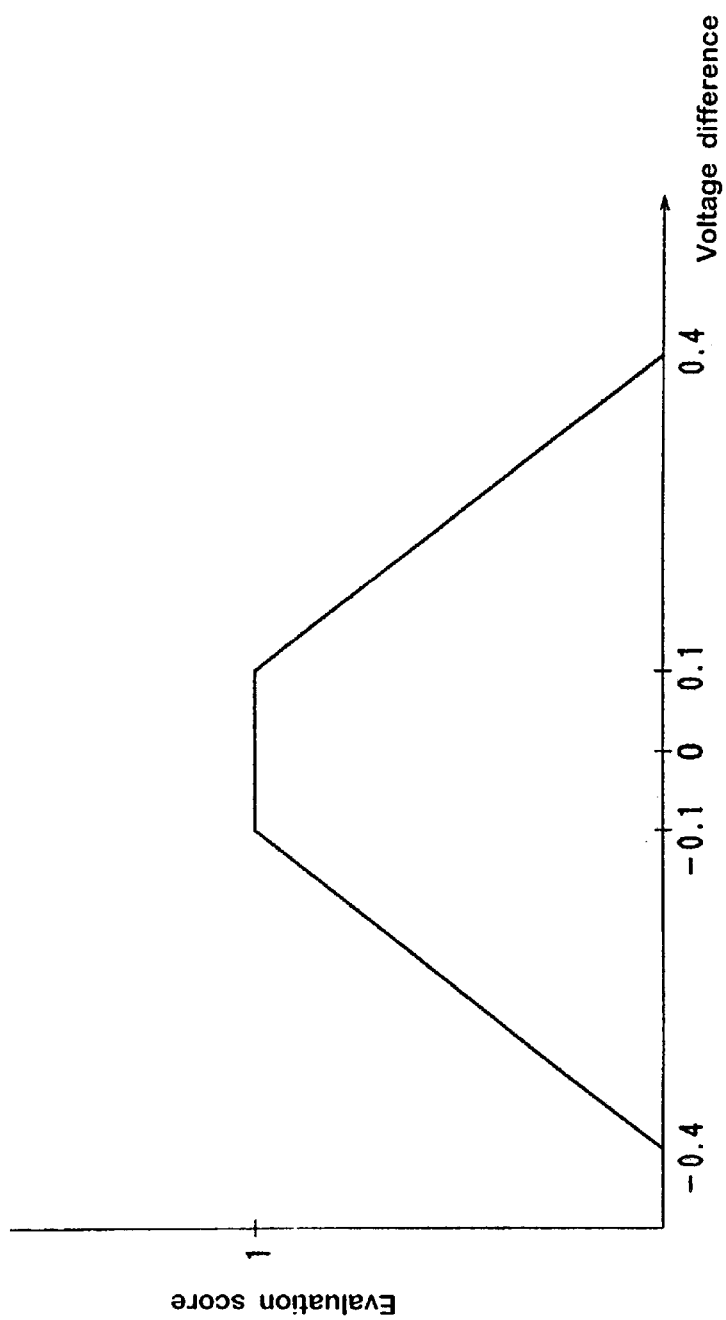
FIG. 23 is a graph for determining degree of pattern agreement.

Next, the peak voltage values are evaluated (step 89). The evaluation in made by comparing the current peak voltage values for the fingers with the learned values of FIG. 19 according to the evaluation graph of FIG. 23. When the difference between the current peak voltage value and the learned peak voltage value is within the range of −0.1 V–+0.1 V, the score will be "1.0". From that point on, scores are given so that the score becomes a zero at the voltage difference of 0.4 V as shown in the graph of the drawing. The scores are recorded in the "peak voltage value" box in the evaluation table shown in FIG. 22. By the way, discrimination between similar letters with similar handwriting strokes such as [厶] and ["] can be made clearly by evaluating the peak voltage values (the peak voltage for the letter [厶] is higher).

Next, the degree of pattern agreement is evaluated (step S10). The degree of pattern agreement indicates to what extent the output voltage waveform from the strain gauges corresponding to the fingers agrees with the learned, stored waveform. This evaluation is made according to the voltage values of respective zones. Here, those symbols and numerals are excluded from the subject of evaluation for which total score of the evaluation of the writing time, evaluation of the numbers of highs and troughs, and evaluation of the peak and bottom positions (with weight to be described later) is lower by one or more than the maximum score.

The degree of pattern agreement is evaluated as described below. For instance, it is assumed that the current output voltage values of the strain gauge for the middle finger for respective zones i (i=1–16) are Vi. On the other hand, it is assumed that the output voltage values, learned for the symbol [O], of the strain gauge for the middle finger for respective zones i are VGi (Refer to FIG. 20). Here, the score for the symbol [O] for the middle finger is determined as follows.

First, a square error m is determined with the equation, $$m = \Sigma_{i-1}^{16}(VGi - Vi)^2$$

The square error is smaller when both waveforms are closer to each other, and greater when they are more apart from each other. Therefore, the inverse of the square error m, or 1/m, is assumed as the degree of pattern agreement. The degree of pattern agreement of the symbol [O] is calculated also for the index finger and thumb in a similar manner.

The calculated scores are recorded in the line for the symbol [O] in the "pattern agreement degree" box on the evaluation table shown in FIG. 22. Furthermore, the degree of pattern agreement is calculated also for other symbols and numerals in a similar manner to that described above and recorded on the evaluation table.

Then, each score on the evaluation table shown in FIG. 22 is weighted by multiplying a predetermined weighting value. An example of weighted evaluation table is shown in FIG. 24. For example, as for the writing time for the numeral [2], the agreement degree score of 0.6 determined with the above procedure becomes 0.58 as a result of being multiplied by a weighting value of 0.97 (0.6×0.97=0.58). The boxes in blank are for those excluded from the subject of evaluation. By the way, the weighting value is set at first at 1.00 and changed according to the rule described later.

The symbol or numeral for which the total score is the highest (numeral [2] in the case of FIG. 24) is determined as one which has been written, and the symbol or numeral is displayed on the CRT 48 (step S11). The writer, confirming that the result recognized with the pen-grip type of input device is correct, inputs a [Y] through the keyboard 46. As a result, the symbol or numeral displayed on the CRT 48 is finalized and input. If not correct, the writer inputs an [N] followed by inputting a correct symbol or numeral (steps S12 and S13).

Through the procedure described above, the learned data stored in the data disk 45 and read in the step S1, and the weighting value are renewed. That is to say, for the writing time, the numbers of highs and troughs, and the peak and bottom positions, the stored learned data is added for one trial only, and stored an data learned through 11 trials. For the peak voltage values and the voltage values for respective zones (pattern agreement degree), an average is calculated again for the currently written symbols and numerals, and stored (step S14).

The weighting values are changed as follows. For the items which have contributed much to lead to the correct answer, 0.01 is added to the current weighting value. For the items which have contributed little to lead to the correct answer, 0.02 is subtracted from the current weighting value.

For example, if a correct [2] is erroneously recognized as [9], scores of both numerals in the evaluation table are compared with each other for the writing time, the numbers of highs and troughs, the peak and bottom positions, the peak voltage values, and the pattern agreement degrees. For those items that gave a higher score to [9] than [2], the weighting values for those items are subtracted by 0.02. If the writing time corresponds to such an item, the current score 0.97 for that item is changed to 0.95.

On the other hand, for those items that gave a higher score to [2] than [9], the weighting values for those items are added by 0.01. If the number of highs for the index finger in the case, the weighting value for that item is changed from the current 0.93 to 0.94.

When the learned data and the weighting values are renewed in this way, the recognition for one letter or symbol or numeral written in the step S2 is over. The renewed learned data and the weighting values are output to the data disk 45 (step S15).

Next, a similar process is carried out for succeeding symbols and numerals. Thus, written symbols and numerals are recognized one by one while comparison of the symbols and numerals and renewal of the learned data are repeated.

By the way, the mercury switches 29*a*, 29*b*, and 29*c* also have the function of function switches as input function selecting means. Those components constitute function supplementing means. When all the voltage values for the middle finger, index finger, and thumb are less than a threshold value Vth, the mercury switches 29*a*, 29*b*, and 29*c* serve as function switches.

The function switch has the function of specifying a subject to be recognized. This function is to select and specify from among the numerals and symbols any one as a subject to be recognized. For instance, when no symbol [O] or [X] is written and only a numeral from among [O]–[9] is written, the subject to be recognized is limited to the numerals only. Thus, only the data related to numerals are read from the learned data, and compared with the waveform characteristics of the written numeral.

To select the specifying function for the subject to be recognized, all the fingers are moved away from the strain gauges 28*a*, 28*b*, and 28*c*, and the manner of holding the pen-grip is adjusted to bring the mercury switches 29*a*, 29*b*, and 29*c* to a held state A. This permits the CPU 40 to select the numeral as the only subject to be recognized. On the other hand, when the mercury switches 29*a*, 29*b*, and 29*c* are brought to a held state B, the symbols are selected as the subject to be recognized. When a desired subject to be recognized appears, any one of the strain gauges is pressed and held for at least 1.0 second. When a voltage not lower than 5 volts is detected for one second or more, the CPU 40 finalizes the selected subject to be recognized.

Figure 25:
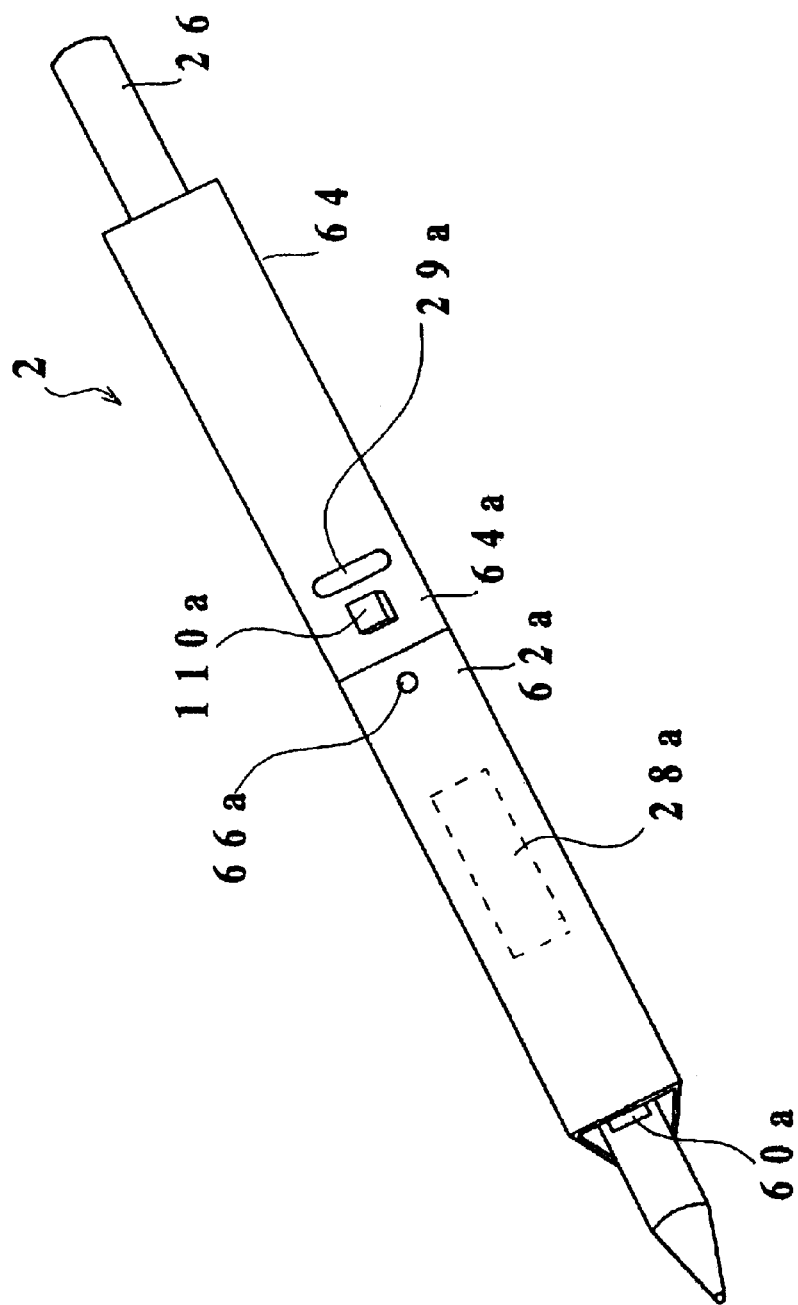
FIG. 25 shows an embodiment provided with a microswitch.

In the above embodiment, the mercury switches 29*a*, 29*b*, and 29*c* also serve as the function switches. An shown in FIG. 25, however, microswitches 110 may be provided as the function switches separate from the mercury switches 29*a*, 29*b*, and 29*c*. These microswitches 110*a*, 110*b*, and 110*c* are disposed on all the three faces 64*a*, 64*b*, and 64*c* of the support body 64.

The microswitches 110*a*, 110*b*, 110*c* are of a type which are turned on when pressed with the index finger or thumb. The corresponding relationship between the fingers and the microswitches is determined in a similar manner to that between the pressure detecting means 4, 5, and 6 and the fingers according to the combinations of on and off states of the mercury switches 29a, 29b, and 29c (Refer to FIGS. 7 and 8). The following description will be made on the assumption that the index finger corresponds to the microswitch 110b, and thumb corresponds to the microswitch 110c. The on or off data of the microswitches 110a, 110b, 110c are given to the CPU 40. The process carried out in the CPU 40 will be described below.

The microswitches 110a, 110b, 110c have functions of specifying the subject to be recognized, erasing symbols and numerals which have been entered by mistake, and input checking.

First, the function of specifying the subject to be recognized will be described. This function is to select and specify any symbol or numeral as the subject to be recognized. For instance, when no symbol [O] or [X] is written and only a numeral from among [O]–[9] is written, the subject to be recognized is limited to the numerals only. Thus, only the data related to numerals are read from the learned data, and compared with the waveform characteristics of the written numeral.

To select the function of specifying the subject to be recognized, the microswitch 110b is pressed and held with the finger for 1.0 second or longer to give the CPU 40 the "on" state for 1.0 second or longer. Then, when the "on" state for 0.1 seconds to 0.3 seconds is detected as a result of instantaneously pressing the microswitch 110b with the index finger, the numeral is selected as the subject to be recognized. On the other hand, when the "on" state for 0.5 to 1.0 second is detected, the symbol is selected as the subject to be recognized. When a desired subject to be recognized is reached, the microswitch 110b is pressed and held for 1.0 second or longer to finalize.

Next, the function of erasing symbols and numerals erroneously entered will be described. Even if the recognition work is carried out correctly, a wrong symbol or numeral will be entered if a wrong symbol or numeral is written. This function is to erase such an input. The erasing function of the microswitch 110c has two erasing modes; the single letter erasing function and the line erasing function.

When the "on" state of the microswitch 110c is detected for 0.1 second to 0.3 second by instantaneously pressing the switch, the single letter erasing function is selected. Therefore, only a single letter or symbol or numeral which is recognized and entered in a computer or the like immediately before, is erased.

On the other hand, the line erasing function is selected when the "on" state is detected for one second or longer as a result of pressing and holding the microswitch 110c with the thumb for a longer period of time. As a result, all the symbols and numerals entered in the same line as that where the symbols and numerals were entered immediately before are erased.

The input checking function is to finalize symbols and numerals which have been recognized and entered. In the previous embodiment, the writer finalizes and enters the recognized result displayed on the CRT 48, when it is correct, by entering a [Y] through the keyboard. In this embodiment, an input is finalized when an "on" state is detected for about 0.5 second as a result of pressing the microswitches 110b and 110c simultaneously with the index finger and the thumb. In the case the recognized result on the CRT 48 is incorrect, the microswitches 110b and 110c are pressed simultaneously with the index finger and the thumb for 0.1 second to 0.3 second to produce an "on" state, and a correct symbol or numeral is entered through the keyboard 46.

The microswitches 110a, 110b, 110c may be used for carrying out various functions through application programs by giving their "on" and "off" states to the CPU 40 and combining those states. In a Japanese word processor, for instance, they may be used as switches for instructing conversion or non-conversion into Chinese characters.

In the above embodiment, the recognition work is done collectively after entering a plural number of symbols and numerals. However, it may also be arranged that the written symbols and numerals are recognized one by one while the writing and comparison of symbols and numerals, and renewal of the learned data are repeated.

In the above embodiment, the symbols and numerals written by the writer are made to be learned and stored as the learned data. However, it may be arranged otherwise in other embodiments: A plural number of learning patterns are obtained by carrying out learning processes by a large number of test persons. The patterns are checked for the best agreement with the symbols and numerals written by a writer. The learning pattern of the best agreement is used for recognition.

While symbols and numerals are written in the above embodiment, characters and graphics may also be written.

Furthermore, while strain gauges 28a, 28b, 28c are used an sensors for detecting the finger pressures in the above embodiment, other sensors may also be used; magnetic sensors utilizing magnetic resistance elements, magnetic sensors utilizing the Hall effect, piezoelectric ceramic pressure sensors, pressure conductive rubber, sensors utilizing capacitance or electromagnetic inductance such as condenser microphone. Furthermore, different sensors may be used from finger to finger.

While three strain gauges 28a, 28b, and 28c are mounted on the pen-grip in the above embodiment, the number of the strain gauges may be four or more, two, or one. The mounting positions of the strain gauges 28a, 28b, and 28c are not limited to those in the above embodiment.

While the held state of the pen-grip 2 is recognized by detecting the direction of the gravity by means of the mercury switches 29a, 29b, and 29c in the above embodiment, the held state of the pen-grip 2 may be recognized by other means. While three mercury switches 29a, 29b, and 29c are provided in the above embodiment, the number of the mercury switches may be four.

While the pen-grip 2 in attached to the writing instrument in the above embodiment, the pen-grip 2 may be integral with the writing instrument.

While the writing time, the number of highs, the number of troughs, the peak positions, the bottom positions, the peak voltage values, and the voltage values of respective zones are evaluated as the waveform characteristics in the above embodiment, other indices may be used as the waveform characteristics. For instance, in place of the voltage values for respective zones, voltage change values or voltage change patterns may be used for evaluating the pattern agreement degree.

The function switches in the above embodiment have the function of specifying the subject to be recognized. However, the function provided for the function switches is not limited to that but may be other functions.

Furthermore in the above embodiment, the corresponding relationship between the strain gauges 28a, 28b, and 28c and the fingers is established with the outputs from the mercury switches 29a, 29b, and 29c. However, the corresponding relationship between the strain gauges 28a, 28b, and 28c and the fingers may be preset, for instance, with the strain gauge 28a corresponding to the middle finger, the strain gauge 28b to the index finger, and the strain gauge 28c to the thumb, so that the writer holds the writing instrument according to the corresponding relationship. Thus, the mercury switches 29a, 29b, and 29c may be omitted.

The above embodiment is arranged to determine the symbols and others by means of only the outputs of the pen-grip 2. However, if the pen-grip 2 of this invention is also used in systems for recognizing symbols and characters written with an electronic pen (stylus pen), using it as a writing instrument for detecting coordinates on the digitizer or liquid crystal panel, character recognition rate will be improved.

Next, an auxiliary input device of pen-grip type as an embodiment of this invention will be described in reference to FIG. 26. A pen-grip 72 comprises a hollow columnar support body 74 and a mercury switch 76 surrounding the outer circumference of the support body 74. The pen-grip 72 is mounted on an inputting pen of an input device, namely on an electronic pen 78.

The mercury switch 76 as shown in FIG. 26C comprises a doughnut-shaped glass container 88 with mercury 90 sealed therein and provided with leads 80, . . . , 87. The leads 80, . . . 87 constitute sets, with each set comprising two leads, to serve as switches. The leads 80, . . . , 87 in the sets are normally open, or in the "off" state. When the electronic pen 78 is rotated, mercury 90 moves in the glass container 88 to close the leads, or set to the "on" state, in one of the sets constituted with the leads 80, . . . , 87. In the state shown in FIG. 26C, the lead 80 is "on", while others are "off". The "on" or "off" state of the leads 80, . . . , 87 is used for selecting input functions which will be described later.

To the CPU are connected the electronic pen 78, the mercury switch 76, a ROM, a RAM, a keyboard, a CRT, and a printer. The number of a lead which is "on" is given to the CPU.

When a user of the pen input device intends to input data with the electronic pen 78, the pen-grip 72 in attached to the electronic pen 78. When the held state of the electronic pen 78 is changed, the leads 80, . . . , 87 to be closed are switched, and thus a desired input mode is selected.

For instance, when a CAD drawing is drawn using the pen input device, the mercury switch 76 is used to switch among types of lines. When the lead 80 of the mercury switch 76 is set to "on" by turning the electronic pen 78, a fine solid line in selected. In a similar manner, a thick solid line is selected when the lead 81 is set to "on", a fine broken line is selected when the lead 82 in set to "on", and a thick broken line is selected when the lead 83 in set to "on".

The type of the line being selected is displayed on the CRT. The selected type of line is finalized by pressing the return key on the keyboard.

While eight sets of leads 80, . . . , 87 are provided in this embodiment, more than eight or less than eight sets may be provided. Alternatively, the mercury switch 76 may be replaced with a specified number of mercury switches 29a of the shape shown in the first embodiment. While the pen-grip 72 is attached to the writing instrument in the above embodiment, the pen-grip 72 may be integral with the writing instrument.

In the above embodiment, the mercury switch 76 is provided with the function of switching the types of lines. However, the function to be provided to the mercury switch 76 is not limited to that but may be other input functions. The term input functions here refers to the input functions of applications applied to the pen input device, for instance, functions of selecting the types of letters being input from among alphabet, Japanese syllabic letters, numerals, etc., and selecting the colors on the CRT display.

While the return key is to be pressed to finalize the selected input function in the above embodiment, other operations may be used for that purpose. Alternatively, the function selected with the mercury switch 76 may be finalized as it is without requiring the finalizing operation.

Furthermore, while the outputs from the mercury switches 29a, 29b, and 29c are serially converted with the adapter 50 and sent to the CPU 40 in the above embodiment, the data may be directly connected to a bus without the serial conversion.

What is claimed is:

1. A pen-grip type of input device comprising:

a support body adapted to be attached to a pen, pressure detecting means provided on the support body and having sensor parts corresponding to at least two fingers of a writer, each of said sensor parts detecting changes in pressure in a direction perpendicular to a longitudinal axis of a pen caused by the corresponding finger of the writer, said sensor parts being provided around the support body;

unit waveform generating means for obtaining outputs of the pressure detecting means showing changes in pressure of each finger and for obtaining a write start point and a write end point of each finer on the basis of the pressure change, and for generating a unit waveform corresponding to each finger, each of said unit waveforms starting from a first one of the write start points of the fingers and ending at a last one of the write end points of the fingers, said unit waveforms corresponding to a single letter, character, numeral, figure or symbol inputted by the writer;

analyzing means for analyzing the unit waveforms to obtain waveform characteristics of the waveforms, and for identifying letters, characters, numerals, figures or symbols which are written by the writer, by comparing the waveform characteristics with reference waveform characteristics which are pre-learned and pre-stored waveform characteristic of letters, characters, numerals, figures or symbols pre-written by the writer, and said unit waveform generating means picks out the unit waveforms on the basis of threshold level.

2. A pen-grip type of input device in accordance with claim 1 wherein said change in pressure detected by the pressure detecting means are pressure changes of a middle finger, an index finger and a thumb of the writer.

3. A pen-grip type of input device in accordance with claim 1 wherein said pressure detecting means comprises;
elastic member; and
strain gages coupled with the elastic member.

4. A pen-grip type of input device in accordance with claim 1 wherein said waveform characteristics to be compared by the analysis means are writing time necessary to form the unit wave form.

5. A pen-grip type of input device in accordance with claim 1 wherein said waveform characteristics to be compared by the analysis means are numbers of peak and bottom appeared in the unit wave form.

6. A pen-grip type of input device in accordance with claim 1 wherein said waveform characteristics to be compared by the analysis means are positions of peak and bottom appeared in the unit wave form.

7. A pen-grip type of input device in accordance with claim 1 wherein
said waveform characteristics to be compared by the analysis means is increase and decrease pattern of unit wave form.

8. A pen-grip type of input device in accordance with claim 1, wherein said unit waveform generating means pick out the unit waveform on the basis of threshold level and differential value of inputted pressure.

9. A pen-grip type of input device in accordance with claim 1 further comprising:
function aid means for selecting and carrying out aid function necessary to help for recognize and input the letter, character, numeral, figure or symbol written by the writer.

10. A pen-grip type of input device in accordance with claim 9, wherein said aid function is function for selecting and designating an object to be recognized by the analysis means from the letter, character, numeral, figure or symbol.

11. A pen-grip type of input device in accordance with claim 9, wherein
said aid function is function for deciding and inputting the letter, character, numeral, figure or symbol recognized by the analysis means.

12. A pen-grip type of input device in accordance with claim 9, wherein
said aid function is function for deleting input letter, character, numeral, figure or symbol.

13. A pen input device comprising:
a pen;
pressure detecting means having sensor parts corresponding to at least two fingers of a writer, each of said sensor parts detecting changes in pressure in a direction perpendicular to a longitudinal axis of the pen caused by the corresponding finger of the writer, said sensor parts being provided around the pen;
unit waveform generating means for obtaining outputs of the pressure detecting means showing changes in pressure of each finger and for obtaining a write start point and a write end point of each finger on the basis of the pressure change, and for generating a unit waveform corresponding to each finger, each of said unit waveforms starting from a first one of the write start points of the fingers and ending at a last one of the write end points, said unit waveforms corresponding to a single letter, character, numeral, figure or symbol inputted by the writer;
analyzing means for analyzing the unit waveforms to obtain waveform characteristics of the waveform, and for identifying letters, characters, numerals, figures or symbols which are written by the writer, by comparing the waveform characteristics with reference waveform characteristics which are pre-learned and pre-stored waveform characteristic of letters, characters, numerals, figures or symbols pre-written by the writer;
said unit waveform generating means picks out the unit waveforms on the basis of threshold level.

14. An input device in accordance with claim 13 wherein said change in pressure detected by the pressure detecting means are pressure changes of a middle finger, an index finger and a thumb of the writer.

15. An input device in accordance with claim 13 wherein said pressure detecting means comprises;
elastic member; and
strain gages coupled with the elastic member.

16. An input device in accordance with claim 13 wherein said waveform characteristics to be compared by the analysis means are writing time necessary to form the unit wave form.

17. An input device in accordance with claim 13 wherein said waveform characteristics to be compared by the analysis means are numbers of peak and bottom appeared in the unit wave form.

18. An input device in accordance with claim 13 wherein said waveform characteristics to be compared by the analysis means are positions of peak and bottom appeared in the unit wave form.

19. An input device in accordance with claim 13 wherein said waveform characteristics to be compared by the analysis means is increase and decrease pattern of unit waveform.

20. An input device in accordance with claim 13 further comprising:
function aid means for selecting and carrying out aid function necessary to help for recognize and input the letter, character, numeral, figure or symbol written by the writer.

21. A pen-grip type of input device in accordance with claim 13, wherein said unit waveform generating means pick out the unit waveform on the basis of threshold level and differential value of inputted pressure.

22. A pen-grip type of input device comprising:
a support body adapted to be attached to a pen,
pressure detecting means being provided on the support body and having sensor parts corresponding to at least two fingers of a writer, each of said sensor detecting changes in pressure toward vertical direction of longitudinal direction of a pen caused by the corresponding finger of the writer, said sensor parts being provided around the pen;
at least three gravity detecting means for detecting gravity direction, said gravity detecting means being provided around the pen;
recognizing means for recognizing held status of the pen on the basis of the output from the gravity detecting means; and
analyzing means for determining which output of the pressure detecting means corresponds to which finger of the writer on the basis of the output from the gravity detecting means, for generating a unit waveform from an output showing a change in pressure issued from the pressure detecting means and analyzing the unit waveform to obtain waveform characteristics of the waveform, and for identifying letters, characters, numerals, figures or symbols which are written by the writer, by comparing the waveform characteristics with reference waveform characteristics which are pre-learned and pre-stored waveform characteristics of letters, characters, numerals, figures or symbols pre-written by the writer;
wherein said unit waveforms correspond to a single letter, character, numeral, figure or symbol input by the writer, and said analyzing means identifies the unit waveform on the basis of threshold level.

23. A pen-grip type of input device in accordance with claim 22 wherein
said change in pressure detected by the pressure detecting means are pressure changes of a middle finger, an index finger and a thumb of the writer.

24. A pen-grip type of input device in accordance with claim 22 wherein said pressure detecting means comprises;
elastic member; and
strain gages coupled with the elastic member.

25. A pen-grip type of input device in accordance with claim 22 wherein
said waveform characteristics to be compared by the analysis means are writing time necessary to form the unit wave form.

26. A pen-grip type of input device in accordance with claim 22 wherein
said waveform characteristics to be compared by the analysis means are numbers of peak and bottom appeared in the unit wave form.

27. A pen-grip type of input device in accordance with claim 22 wherein
said waveform characteristics to be compared by the analysis means are positions of peak and bottom appeared in the unit wave form.

28. A pen-grip type of input device in accordance with claim 22 wherein
said waveform characteristics to be compared by the analysis means is increase and decrease pattern of unit waveform.

29. A pen-grip type of input device in accordance with claim 22 further comprising:
function aid means for selecting and carrying out aid function necessary to help for recognize and input the letter, character, numeral, figure or symbol written by the writer.

30. A pen-grip type of input device in accordance with claim 22, wherein said analyzing means identifies the unit waveform on the basis of threshold level and differential value of inputted pressure.

31. A pen input device comprising:
a pen;
pressure detecting means having sensor parts corresponding to at least two fingers of a writer, each of said sensor detecting changes in pressure toward vertical direction of longitudinal direction of the pen caused by the corresponding finger of the writer, said sensor parts being provided around the pen;
at least three gravity detecting means for detecting gravity direction, said gravity detecting means being provided around the pen;
recognizing means for recognizing held status of the pen on the basis of the output from the gravity detecting means; and
analyzing means for determining which output of the pressure detecting means corresponds to which finger of the writer on the basis of the output from the gravity detecting means, for generating a unit waveform from an output showing a change in pressure issued from the pressure detecting means and analyzing the unit waveform to obtain waveform characteristics of the waveform, and for identifying letters, characters, numerals, figures or symbols which is written by the writer, by comparing the waveform characteristics with reference waveform characteristics which are pre-learned and pre-stored waveform characteristics of letters, characters, numerals, figures or symbols pre-written by the writer;
wherein said unit waveforms correspond to a single letter, character, numeral, figure or symbol input by the writer, and said analyzing means identifies the unit waveform on the basis of threshold level.

32. An input device in accordance with claim 31 wherein
said change in pressure detected by the pressure detecting means are pressure changes of a middle finger, an index finger and a thumb of the writer.

33. An input device in accordance with claim 31 wherein
said pressure detecting means comprises;
elastic member; and
strain gages coupled with the elastic member.

34. An input device in accordance with claim 31 wherein
said waveform characteristics to be compared by the analysis means are writing time necessary to form the unit wave form.

35. An input device in accordance with claim 31 wherein
said waveform characteristics to be compared by the analysis means are numbers of peak and bottom appeared in the unit wave form.

36. An input device in accordance with claim 31 wherein
said waveform characteristics to be compared by the analysis means are positions of peak and bottom appeared in the unit wave form.

37. An input device in accordance with claim 31 wherein
said waveform characteristics to be compared by the analysis means is increase and decrease pattern of unit waveform.

38. A pen-grip type of input device in accordance with claim 31 further comprising:
function aid means for selecting and carrying out aid function necessary to help for recognize and input the letter, character, numeral, figure or symbol written by the writer.

39. A pen-grip type of input device in accordance with claim 31, wherein said analyzing means identifies the unit waveform on the basis of threshold level and differential value of inputted pressure.

40. A computer readable storage medium storing a computer program,
said computer program determining pressure changes of fingers of a writer on a pen-grip type of input device based upon output pressure signals provided to the program, sensors to obtain a write start point and a write end point of each finger on the basis of the determined pressure changes, and said program generating a unit waveform corresponding to each finger, each of said unit waveforms starting from a first one of the write start points of the fingers and ending at a last one of the write end points of the fingers;
and said program carrying out an analysis of the unit waveform to obtain waveform characteristics of the waveform, and identifying letters, characters, numerals, figures or symbols which are written by the writer, by comparing the waveform characteristics with reference waveform characteristics which are pre-learned and pre-stored waveform characteristics of letters, characters, numerals, figures or symbols pre-written by the writer;
wherein said unit waveforms correspond to a single letter, character, numeral, figure or symbol input by the writer, and said program identifies the unit waveform on the basis of threshold level.

41. A pen-grip type of input device in accordance with claim 40, wherein said program identifies the unit waveform on the basis of threshold level and differential value of inputted pressure.

42. A pen-grip type of input device comprising:
at least two pressure detecting means for detecting a pressure change by at least two fingers of writer, said pressure detecting means being provided around a pen corresponding to each of said fingers of writer;

at least three gravity detecting means for detecting gravity direction, said gravity detecting means being provided around the pen;

recognition means for recognizing holding status of the pen in the basis of the output from the gravity detecting means;

analysis means for determining which output of the pressure detecting means corresponding to which finger of the writer on the basis of the output from the gravity detecting means, for generating a unit waveform from output showing a change in pressure issued from the pressure detecting means and analyzing the unit waveform to obtain waveform characteristics of the waveform, and for identifying letters, characters, numerals, figures or symbols which are written by the writer, by comparing the waveform characteristics with reference waveform characteristics which are pre-learned and pre-stored waveform characteristics of letters, characters, numerals, figures or symbols pre-written by the writer; and function selecting means for selecting input function of the pen input device in the basis of the output of the gravity detecting means.

43. An input device comprising:

a pen;

at least two pressure detecting means for detecting a pressure change by at least two fingers of writer, said pressure detecting means being provided around the pen corresponding to each of said fingers of writer;

at least three gravity detecting means for detecting gravity direction, said gravity detecting means being provided around the pen;

recognition means for recognizing holding status of the pen in the basis of the output from the gravity detecting means;

analysis means for determining which output of the pressure detecting means corresponds to which finger of the writer on the basis of the output from the gravity detecting means, for generating a unit waveform from output showing the pressure change issued by the pressure detecting means and analyzing the unit waveform to obtain waveform characteristics of the waveform, and for identifying letters, characters, numerals, figures or symbols which are written by the writer, by comparing the waveform characteristics with referenced waveform characteristics which are pre-learned and pre-stored waveform characteristics of letters, characters, numerals, figures or symbols pre-written by the writer; and function selecting means for selecting input function of the pen input device in the basis of the output of the gravity detecting means.

* * * * *